United States Patent
Jang et al.

(10) Patent No.: US 11,943,809 B2
(45) Date of Patent: Mar. 26, 2024

(54) METHOD AND DEVICE FOR CONTROLLING PLURALITY OF LINKS IN WIRELESS LOCAL AREA NETWORK SYSTEM SUPPORTING PLURALITY OF LINKS

(71) Applicant: LG ELECTRONICS INC., Seoul (KR)

(72) Inventors: Insun Jang, Seoul (KR); Suhwook Kim, Seoul (KR); Jeongki Kim, Seoul (KR); Kiseon Ryu, Seoul (KR); Sungjin Park, Seoul (KR); Taewon Song, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 526 days.

(21) Appl. No.: 17/267,438

(22) PCT Filed: Aug. 9, 2019

(86) PCT No.: PCT/KR2019/010043
§ 371 (c)(1),
(2) Date: Feb. 9, 2021

(87) PCT Pub. No.: WO2020/032664
PCT Pub. Date: Feb. 13, 2020

(65) Prior Publication Data
US 2021/0329698 A1    Oct. 21, 2021

(30) Foreign Application Priority Data

Aug. 10, 2018  (KR) .................. 10-2018-0094066
Sep. 6, 2018   (KR) .................. 10-2018-0106739

(51) Int. Cl.
*H04W 74/08*    (2009.01)
*H04W 72/0446*  (2023.01)
(Continued)

(52) U.S. Cl.
CPC ... *H04W 74/0816* (2013.01); *H04W 72/0446* (2013.01); *H04W 72/21* (2023.01); *H04W 80/02* (2013.01); *H04W 84/12* (2013.01)

(58) Field of Classification Search
CPC ......... H04W 72/0446; H04W 74/0816; H04W 80/02; H04W 84/12
See application file for complete search history.

(56) References Cited

U.S. PATENT DOCUMENTS

| 2016/0021667 | A1  | 1/2016  | Kwon et al. |
| 2017/0006541 | A1  | 1/2017  | Huang et al. |
| 2017/0289987 | A1* | 10/2017 | Seok ............ H04W 74/08 |

FOREIGN PATENT DOCUMENTS

| EP | 3373682 A1 * | 9/2018 | ............ H04W 72/08 |
| KR | 10-2018-0002665 | 1/2018 | |
| KR | 10-2018-0010172 | 1/2018 | |

OTHER PUBLICATIONS

PCT International Application No. PCT/KR2019/010043, International Search Report dated Nov. 21, 2019, 4 pages.
(Continued)

*Primary Examiner* — Zhensheng Zhang
(74) *Attorney, Agent, or Firm* — LEE, HONG, DEGERMAN, KANG & WAIMEY

(57) ABSTRACT

According to various embodiments, a method performed in a wireless local area network (WLAN) system may comprise the steps of: receiving, by a first station (STA) supporting a first and a second link, a physical protocol data unit (PPDU) generated for a second STA, via the first link, the PPDU being received from a BSS to which the first STA belongs; setting, by the first STA, a first type NAV for the
(Continued)

first link on the basis of the PPDU; and setting, by the first STA, a first type NAV for the second link on the basis of the PPDU.

8 Claims, 32 Drawing Sheets

(51) Int. Cl.
*H04W 72/21* (2023.01)
*H04W 74/0816* (2024.01)
*H04W 80/02* (2009.01)
*H04W 84/12* (2009.01)

(56) References Cited

OTHER PUBLICATIONS

Po-Kai Huang, "11ax D3.0 Mac Comment Resolution for NAV—Part I", IEEE P802.11 Wireless LANs, Jul. 2018, 8 pages.

* cited by examiner

FIG. 3

| Channel | F₀ (MHz) | North America | Japan | Most of world |
|---|---|---|---|---|
| 1 | 2412 | Yes | Yes | Yes |
| 2 | 2417 | Yes | Yes | Yes |
| 3 | 2422 | Yes | Yes | Yes |
| 4 | 2427 | Yes | Yes | Yes |
| 5 | 2432 | Yes | Yes | Yes |
| 6 | 2437 | Yes | Yes | Yes |
| 7 | 2442 | Yes | Yes | Yes |
| 8 | 2447 | Yes | Yes | Yes |
| 9 | 2452 | Yes | Yes | Yes |
| 10 | 2457 | Yes | Yes | Yes |
| 11 | 2462 | Yes | Yes | Yes |
| 12 | 2467 | No except CAN | Yes | Yes |
| 13 | 2472 | Yes | Yes | Yes |
| 14 | 2484 | Yes | 11b Only | No |

METHOD AND DEVICE FOR CONTROLLING PLURALITY OF LINKS IN WIRELESS LOCAL AREA NETWORK SYSTEM SUPPORTING PLURALITY OF LINKS

CROSS-REFERENCE TO RELATED APPLICATIONS

This application is the National Stage filing under 35 U.S.C. 371 of International Application No. PCT/KR2019/010043, filed on Aug. 9, 2019, which claims the benefit of earlier filing date and right of priority to Korean Application Nos. 10-2018-0094066, filed on Aug. 10, 2018 and 10-2018-0106739, filed on Sep. 6, 2018, the contents of which are all hereby incorporated by reference herein in their entirety.

BACKGROUND OF THE DISCLOSURE

Field of the Disclosure

The present disclosure relates to a technique of controlling at least one link in a wireless LAN system supporting multiple links, and particularly, to a method and apparatus for setting a network allocation vector (NAV) for at least one link.

Related Art

Wireless network technologies may include various types of wireless local area networks (WLANs). WLANs can be used to connect neighboring devices to each other by employing widely used networking protocols. Various technical features described in the present disclosure can be applied to arbitrary communication standards, for example, WiFi, and more generally, any one of IEEE 802.11 wireless protocol groups.

In a wireless local area network (WLAN), methods for preventing collision between packets have been improved in various manners. For example, carrier sense multiple access with collision avoidance (CSMA/CA) was conventionally proposed as one of various methods.

The present disclosure proposes technical features that can improve legacy standards or can be used in new communication standards. Specifically, a station (STA) can set a network allocation vector (NAV) serving as a timer for reservation of use of media. Further, the STA can prevent collision in a channel (or band) through a NAV.

SUMMARY

A station (STA) based on IEEE 802.11 standards generally uses a single channel to transmit a single packet or frame. Accordingly, a legacy STA need not transmit a signal through a plurality of channels in a transmission opportunity (TXOP). A multi-link can be supported from IEEE 802.11be.

An example of the present disclosure proposes a method and apparatus for setting a NAV in a wireless LAN system. Specifically, in a case where a signal (or PPDU) is transmitted through a multi-link in which at least one link is aggregated, a transmitting STA cannot simultaneously transmit and receive signals through a link other than a signal transmitting link. Accordingly, when the transmitting STA transmits a signal in a basic service set (BSS), another STA in the BSS may require NAV setting.

A NAV may be set differently in response to an STA operation capable of sensing/detecting a signal of a transmitting STA in a BSS, an STA operation incapable of sensing/detecting a signal of the transmitting STA, and an STA operation in an overlapping BSS (OBSS).

A method performed in a wireless local area network (WLAN) system according to various embodiments may include: receiving, by a first STA supporting first and second links, a physical protocol data unit (PPDU) generated for a second STA through the first link, the PPDU being received from a BSS to which the first STA belongs; setting, by the first STA, a first type NAV for the first link on the basis of the PPDU; and setting, by the first STA, a first type NAV for the second link on the basis of the PPDU.

According to an example according to the present disclosure, a receiving STA can set a NAV according to a signal transmitted from a transmitting STA through a multi-link. The receiving STA capable of sensing/detecting a signal of the transmitting STA through a first link of the multi-link can set a NAV for the first link. The receiving STA can set the same NAV for a second link distinguished from the first link supported by the receiving STA. During multi-link transmission of a signal from the transmitting STA, the receiving STA may not transmit a signal to the transmitting STA through the second link because the NAV has also been set for the second link. Accordingly, collision between a transmitted signal and a received signal may not occur in the transmitting STA. According to an example of the present disclosure, a method for setting a NAV in a multi-link transmission situation can allow efficient signal transmission.

BRIEF DESCRIPTION OF THE DRAWINGS

FIG. 3 is a view illustrating an example of a physical protocol data unit (PPDU) used in the IEEE standard.

DESCRIPTION OF EXEMPLARY EMBODIMENTS

Through the specification, when it is said that a certain part includes specific elements or a certain process includes specific steps, this means that the part or process may further include other elements or other steps. That is, the terms used in the specification are merely used in order to describe particular embodiments, and are not intended to limit the scope of the present disclosure.

As used herein, a slash (/) or comma may indicate "and/or". For example, "A/B" may indicate "A and/or B," and therefore may mean "only A", "only B", or "A and B". Technical features that are separately described in one drawing may be implemented separately or may be implemented simultaneously.

As used herein, parentheses may indicate "for example". Specifically, "control information (Signal)" may mean that "Signal" is proposed as an example of "control information". Further, "control information (i.e., signal)" may also mean that "signal" is proposed as an example of "control information".

The following examples of the present specification may be applied to various wireless communication systems. For example, the following examples of the present specification may be applied to a wireless local area network (WLAN) system. For example, the present specification may be applied to IEEE 802.11a/g/n/ac or IEEE 802.11ax. The present specification may also be applied to a newly proposed EHT standard or a new WLAN stand which has enhanced IEEE 802.11be.

Hereinafter, technical features of a WLAN system to which the present disclosure is applicable will be described in order to describe technical features of the present disclosure.

Figure 1:
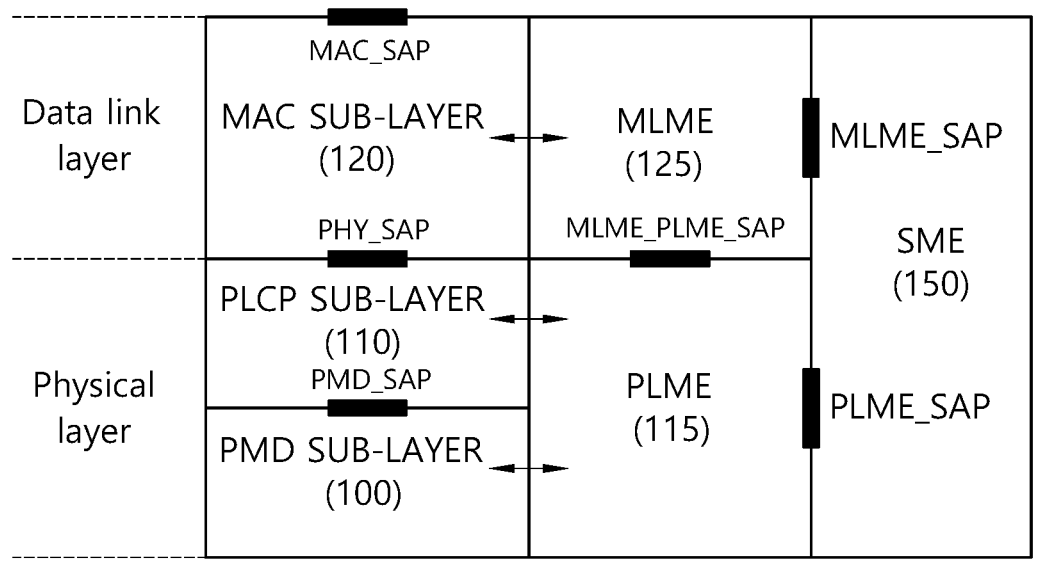
FIG. 1 is a conceptual view illustrating a structure of a WLAN.

FIG. 1 is a conceptual view illustrating a layer architecture of a WLAN system supported by IEEE 802.11. Referring to FIG. 1, the layer architecture of the WLAN system may include a physical medium dependent (PMD) sublayer 100, a physical layer convergence procedure (PLCP) sublayer 110, and a medium access control (MAC) sublayer 120.

The PMD sublayer 100 may serve as a transmission interface for transmitting and receiving data between a plurality of STAs. The PLCP sublayer 110 is implemented such that the MAC sublayer 120 can operate with a minimum dependency on the PMD sublayer 100.

The PMD sublayer 100, the PLCP sublayer 110, and the MAC sublayer 120 may conceptually include management entities. For example, the management entity of the MAC sublayer 120 is referred to as a MAC layer management entity (MLME) 125. The management entity of the physical layer is referred to as a PHY layer management entity (PLME) 115.

These management entities can provide interfaces for performing a layer management operation. For example, the PLME 115 can be connected to the MLME 125 to perform a management operation for the PLCP sublayer 110 and the PMD sublayer 100. The MLME 125 can be connected to the PLME 115 to perform a management operation for the MAC sublayer 120.

For a correct MAC layer operation, an STA management entity (SME) 150 may be present. The SME 150 can be operated as a component independent of each layer. The PLME 115, the MLME 125, and the SME 150 can transmit/receive information to/from each other on the basis of primitive.

The operation of each sublayer will be briefly described below. For example, the PLCP sublayer 110 transfers a MAC protocol data unit (MPDU) received from the MAC sublayer 120 to the PMD sublayer 100 or transfers a frame from the PMD sublayer 100 to the MAC sublayer 120 according to an instruction of the MAC layer between the MAC sublayer 120 and the PMD sublayer 100.

The PMD sublayer 100 is a sublayer of PLCP and can perform transmission and reception of data between a plurality of STAs through a radio medium. An MPDU transmitted from the MAC sublayer 120 is referred to as a physical service data unit (PSDU) in the PLCP sublayer 110. Although an MPDU is similar to a PSDU, individual MPDUs may differ from PSDUs in a case where an aggregated MPDU (AMPDU) obtained by aggregating a plurality of MPDUs is transmitted.

The PLCP sublayer 110 adds an additional field including necessary information to a PSDU by a transceiver of the physical layer in a process of receiving the PSDU from the MAC sublayer 120 and transmitting the PSDU to the PMD sublayer 100. Here, the field added to the PSDU may include a PLCP preamble, a PLCP header, tail bits necessary to return a convolution encoder to a zero state, and the like.

The PLCP sublayer 110 adds the aforementioned field to the PSDU to generate a PHY protocol data unit (PPDU) and transmits the PPDU to a receiving STA via the PMD sublayer 100, and the receiving STA receives the PPDU, acquires information necessary for data restoration from the PLCP preamble and the PLCP header, and restores data.

An STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various names such as a mobile terminal, a wireless device, a wireless transmit/receive unit (WTRU), user equipment (UE), a mobile station (MS), a mobile subscriber unit, or just a user.

Figure 2:
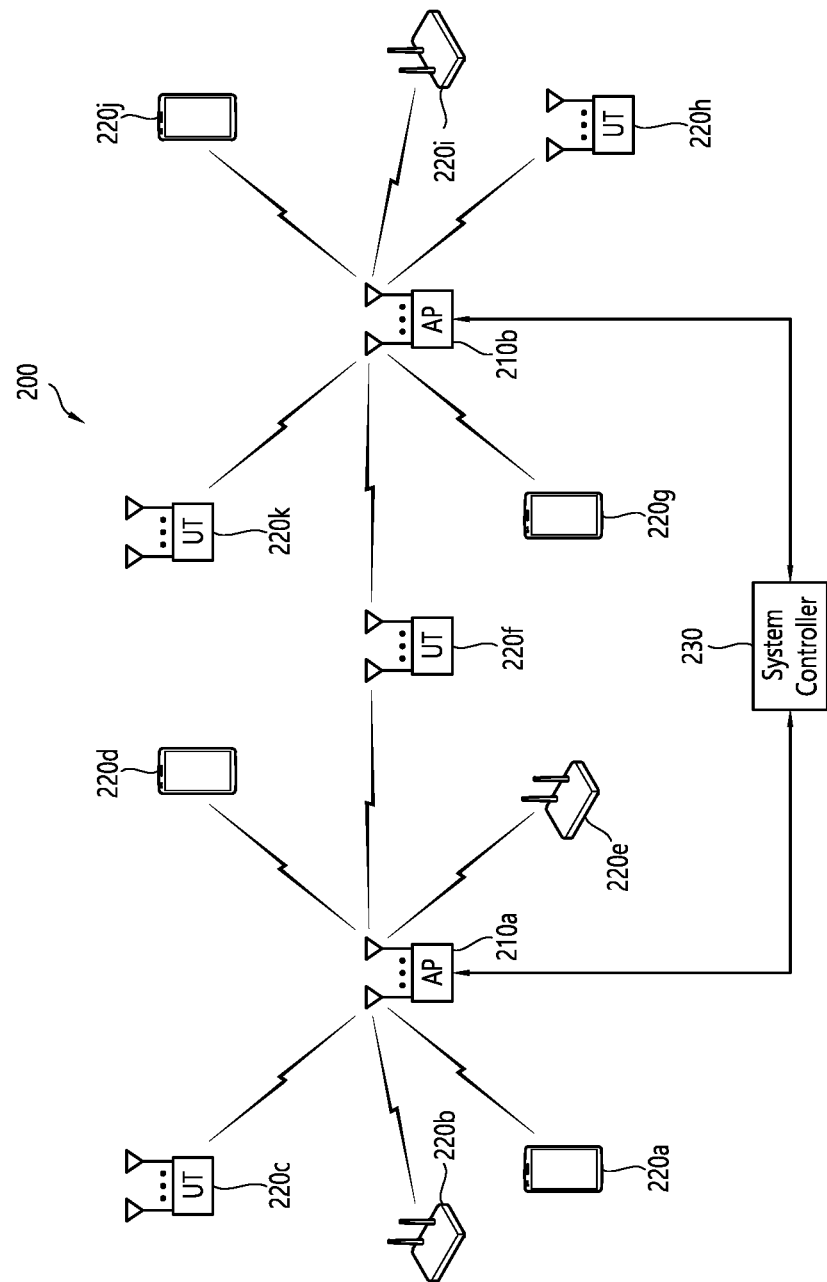
FIG. 2 is a view illustrating a general link setup process.

FIG. 2 illustrates an example of a WLAN system.

As illustrated, the WLAN system includes at least one access point (AP) and a plurality of STAs 520*a/b/c/e/d/f/g/h/i/j/k* associated with the AP. The plurality of STAs in the example of FIG. 2 can execute functions of an AP and/or a non-AP. The plurality of STAs 520*a/b/c/e/d/f/g/h/i/j/k* in FIG. 2 may be called various names such as a user terminal (UT). In addition, at least one STA 520*f* in FIG. 2 may route/relay communication between a plurality of APs 510*a/b*, control a plurality of APs, or control STAs associated with the plurality of Aps 510*a/b*.

Furthermore, the APs 510*a/b* in FIG. 2 may be connected to a system control device 530 to communicate with another AP or a network entity (e.g., a network entity or an Internet server defined by 3GPP) other than an AP.

The plurality of STAs illustrated in FIG. 2 may constitute basic service sets (BSSs).

BSSs 100 and 105 are sets of APs and STAs that can be successfully synchronized and can communicate with each other and do not refer to specific areas. A BSS may include one or more STAs that can be associated with a single AP.

A BSS may include a distribution system that connects at least one STA, an AP that provides a distribution service, and a plurality of APs.

The distribution system can constitute an extended service set by connecting a plurality of BSSs. The ESS may be used as a term indicating a network constructed by connecting one or more APs through the distribution system. APs included in a single ESS may have the same service set identification (SSID).

A portal can serve as a bridge for connection to WLAN network (IEEE 802.11) and another network (e.g., 802.X).

STAs may establish a network and perform communication therebetween without an AP. This network may be called an ad-hoc network or an independent basic service set (IBS S).

FIG. 3 is a diagram illustrating frequency domains used in a WLAN system.

A WLAN system can use at least one channel defined in a 2.4 GHz band. The 2.4 GHz band may be called other names such as a first band.

As illustrated in FIG. 3, 14 channels can be configured in a 4 GHz band. Each channel can be configured as a 20 MHz frequency domain (or bandwidth). FO indicates a center frequency. The channels in the 2.4 GHz band have center frequencies at intervals of 5 MHz except channel #14. Neighboring channels among the 14 channels may overlap. Allowed frequency channels or maximum power levels in allowed frequency channels may be set differently for countries. For example, channel #13 may be allowed in most countries although it is not allowed in North America.

Specific numerical values in the example of FIG. 3 may be changed.

Figure 4:
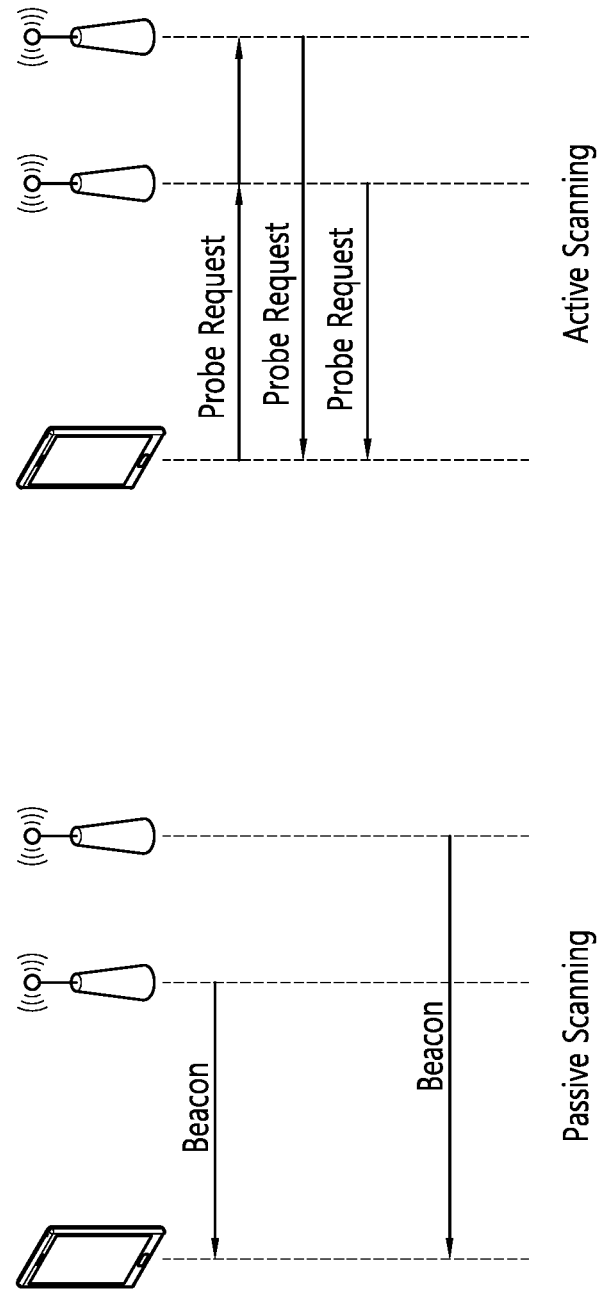
FIG. 4 is a view illustrating an arrangement of a resource unit (RU) used in a 20 MHz band.

FIG. 4 illustrates an example with respect to network discovery.

To access a WLAN, an STA needs to perform discovery with respect to the network. Such discovery can be performed through a scanning process for the network. Scanning may be divided into active scanning and passive scanning.

As illustrated in FIG. 4, an STA that performs active scanning can transmit a probe request frame in order to search neighboring APs while moving channels and wait for a response thereto. A responder can transmit a probe response frame to the STA that has transmitted the probe request frame in response to the probe request frame. The responder may be an STA that has transmitted a last beacon frame in a BSS of a channel that is being scanned. An AP is a responder in a BSS because the AP transmits a beacon frame, and a responder may be changed in an IBSS because STAs transmit a beacon frame in rotation.

When the STA transmits the probe request frame through channel #1 and receives the probe response frame through channel #1, the STA can store information about a BSS included in the probe response frame, move to the next channel (e.g., channel #2), and repeat scanning in the same manner.

As illustrated in FIG. 4, scanning may be performed in a passive scanning manner. An STA that performs passive scanning can receive a beacon frame while moving channels.

The beacon frame is an example of a management frame in IEEE 802.11. The beacon frame can be periodically transmitted. The STA that has received the beacon frame can store BSS related information included in the received beacon frame, move to the next channel, and perform passive scanning in the next channel.

Although not illustrated in FIG. 4, a plurality of processes may be performed after the scanning procedure of FIG. 4.

For example, an authentication process may be performed after the scanning procedure. The authentication process may include a process in which an STA transmits an authentication request frame to an AP and the AP transmits an authentication response frame to the STA in response to the authentication request frame. An authentication frame used for an authentication request/response corresponds to the management frame.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

Figure 5:
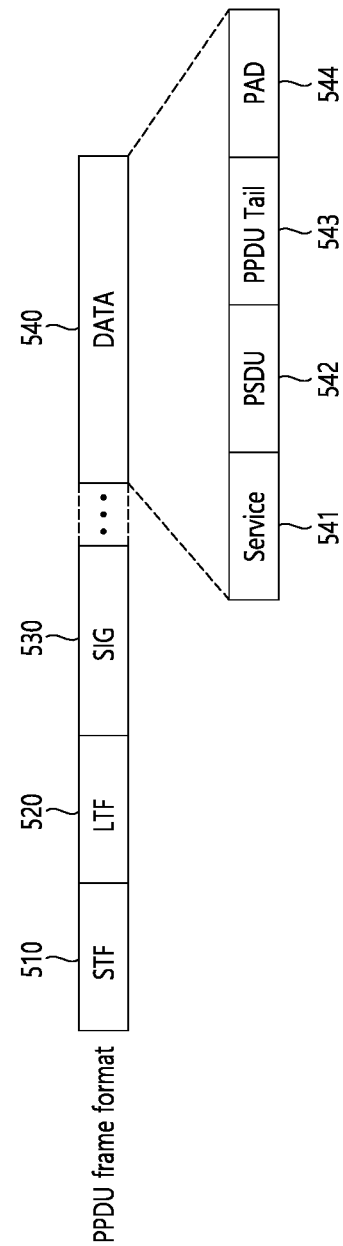
FIG. 5 is a view illustrating an arrangement of a resource unit (RU) used in a 40 MHz band.

FIG. 5 illustrates an example of a PPDU transmitted/received by an STA of the present disclosure.

The example of FIG. 5 illustrates representative fields of the PPDU, and the order of the fields illustrated in FIG. 5 can be changed in various manners.

The PPDU of FIG. 5 may include a short training field (STF) 510.

The STF 510 may be realized as an L-STF, an HT-STF, a VHT-STF, an HE-STF, an EHT-STF, and the like which will be described later. STF 510 can be used for frame detection, automatic gain control (AGC), diversity detection, coarse frequency/time synchronization, and the like.

The PPDU of FIG. 5 may include a long training field (LTF) 520.

The LTF 520 may be realized as an L-LTF, an HT-LTF, a VHT-LTF, an HE-LTF, an EHT-LTF, and the like which will be described later. The LTF 520 can be used for fine frequency/time synchronization and channel prediction.

The PPDU of FIG. 5 may include an SIG 530.

The SIG 530 may be realized as an L-SIG, an HT-SIG, a VHT-SIG, an HE-SIG, an EHT-SIG, and the like which will be described later. The SIG 530 may include control information for decoding the PPDU.

The PPDU of FIG. 5 may include a data field 540.

The data field 540 may include a service field 541, a physical layer service data unit (PSDU) 542, a PPDU tail bit 543, and padding bits 544. Some bits of the service field 541 can be used for synchronization of a descrambler at a receiving stage. The PSDU 542 corresponds to a MAC protocol data unit (MPDU) defined in the MAC layer and may include data generated/used in a higher layer. The PPDU tail bit 543 can be used to return an encoder to a zero state. The padding bits 544 can be used to adjust the length of the data field to a predetermined unit.

Figure 6:
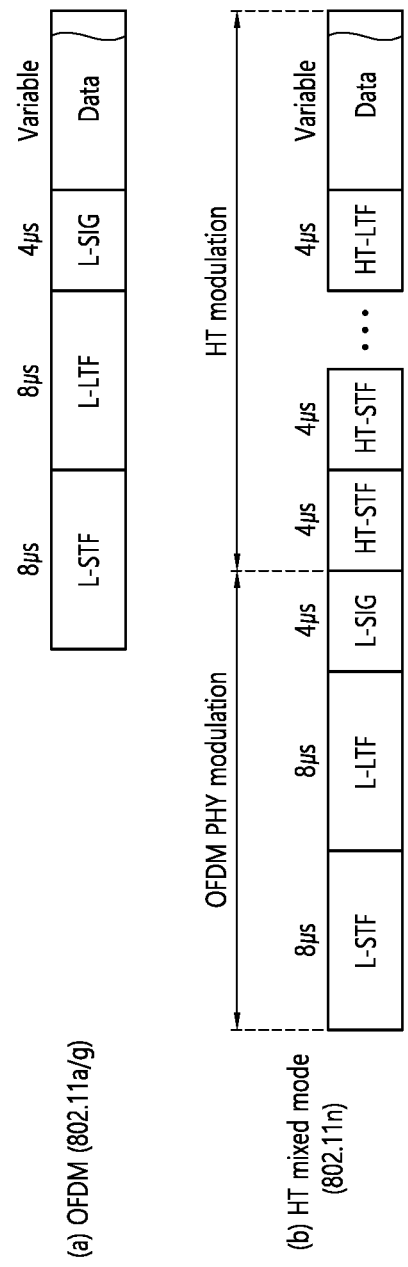
FIG. 6 is a view illustrating an arrangement of a resource unit (RU) used in an 80 MHz band.

FIG. 6 illustrates examples of PPDUs according to legacy WLAN standards.

A PPDU illustrated in subfigure (a) of FIG. 6 is an example of a PPDU used in IEEE 802.11a/g.

A PPDU illustrated in subfigure (b) of FIG. 6 is an example of a PPDU used in IEEE 802.11n.

Figure 7:
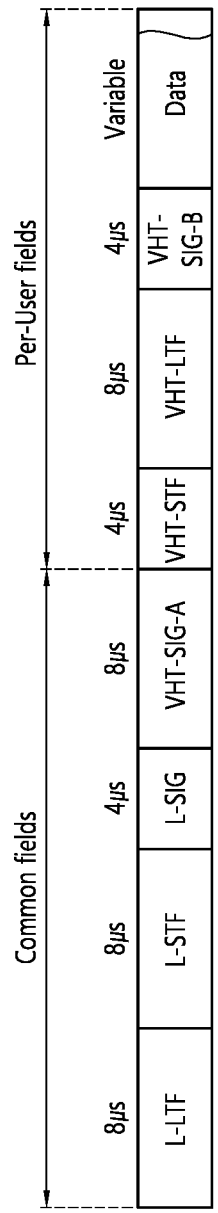
FIG. 7 is a view illustrating another example of an HE-PPDU.

FIG. 7 illustrates another example of a PPDU according to legacy WLAN standards.

FIG. 7 illustrates an example of a PPDU according to IEEE 802.11ac. Illustrated common fields include legacy L-STF, L-LTF, and L-SIG and further include a VHT-SIG-A field newly suggested in IEEE 802.11ac. The PPDU of FIG. 7 can be used for both single-user (SU) communication through which an AP transmits a signal to a single user STA and multi-user (MU) communication through which an AP transmits signals to multiple user STAs. In a case where MU communication is performed, the VHT-SIG-A field includes common control information commonly applied to all receiving STAs.

Per-User fields illustrated in FIG. 7 include a field transmitted for at least one user STA when MU communication is performed. A VHT-STF field is an STF field newly suggested in the VHT standard (i.e., IEEE 802.11ac) and A VHT-LTF field is an LTF field newly suggested in the VHT standard. A VHT-SIG-B field includes information for decoding the data field and can be individually configured per receiving STA.

The PPDU of FIG. 7 can be transmitted to a plurality of STAs on the basis of MU-MIMO (multi-user multiple input, multiple output). Further, the PPDU can be transmitted to a single STA on the basis of SU-MIMO.

Figure 8:
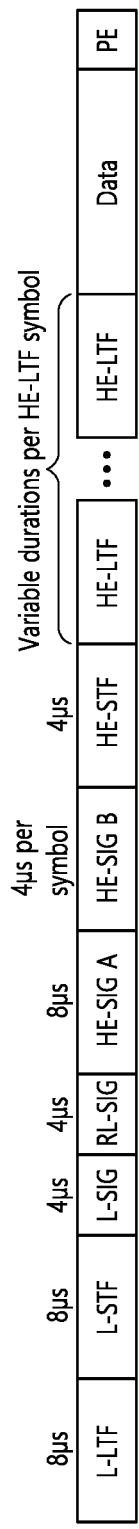
FIG. 8 is a view illustrating an example of a frame structure used in the IEEE 802.11 system.

FIG. 8 is a diagram illustrating another example of an HE-PPDU.

The example of FIG. 8 can be applied to IEEE 802.11ax or HE (high efficiency) WLAN systems. Four PPDU formats according to IEEE 802.11ax are defined, and FIG. 8 illustrates an example of an MU-PPDU used for MU communication. However, some technical features applied to fields illustrated in FIG. 8 may be used for SU communication or UL-MU communication as they are.

Technical features of the HE-PPDU illustrated in FIG. 8 can be applied to an EHT-PPDU to be newly suggested. For example, technical features applied to the HE-SIG can be applied to an EHT-SIG and technical features applied to the HE-STF/LTF can be applied to an EHT-STF/LTF.

An L-STF in FIG. 8 may include a short training orthogonal frequency division multiplexing (OFDM) symbol. The L-STF can be used for frame detection, automatic gain control (AGC), diversity detection, and coarse frequency/time synchronization.

An L-LTF in FIG. 8 may include a long training orthogonal frequency division multiplexing (OFDM) symbol. The L-LTF can be used for fine frequency/time synchronization and channel prediction.

An L-SIG in FIG. 8 can be used to transmit control information. The L-SIG may include information about a data rate and a data length. Further, the L-SIG may be repeatedly transmitted. That is, the L-SIG may be configured in a repeated format (which may be called an R-LSIG, for example).

HE-SIG-A in FIG. 8 may include control information common for receiving stations.

Specifically, HE-SIG-A may include information about 1) a DL/UL indicator, 2) a BSSS color field that is a BSS identifier, 3) a field indicating a remaining time of a current TXOP period, 4) a bandwidth field indicating 20, 40, 80, 160, or 80+80 MHz, 5) a field indicating an MCS applied to HE-SIG-B, 6) a field indicating whether HE-SIG-B is modulated through dual subcarrier modulation for MCS, 7) a field indicating the number of symbols used for HE-SIG-B, 8) a field indicating whether HE-SIG-B is generated over the entire band, 9) a field indicating the number of symbols of HE-LTF, 10) a field indicating an HE-LTF length and a CP length, 11) a field indicating whether there are additional OFDM symbols for LDPC coding, 12) a field indicating control information about packet extension (PE), and 13) a field indicating information about a CRC field of HE-SIG-A. Such specific fields of HE-SIG-A may be added or some thereof may be omitted. In addition, some fields may be added to or omitted from HE-SIG-A in embodiments other than MU environments.

HE-SIG-B in FIG. 8 can be included only in the case of a PPDU for MU, as described above. Basically, HE-SIG-A or HE-SIG-B may include resource allocation information (or virtual resource allocation information) about at least one receiving STA.

An HE-STF in FIG. 8 can be used to improve automatic gain control estimation in a MIMO (multiple input multiple output) environment or an OFDMA environment.

An HE-LTF in FIG. 8 can be used for channel estimation in a MIMO environment or an OFDMA environment.

A size of FFT/IFFT applied to fields after the HE-STF and HE-STF of FIG. 8 may differ from a size of FFT/IFFT applied to fields before the HE-STF. For example, the size of FFT/IFFT applied to fields after the HE-STF and HE-STF may be four times the size of FFT/IFFT applied to fields before the HE-STF.

For example, when at least one of the L-STF, L-LTF, L-SIG, HE-SIG-A, and HE-SIG-B of the PPDU in FIG. 8 is referred to as a first field/part, at least one of the data field, HE-STF, and HE-LTF may be referred to as a second field/part. The first field may include fields related to legacy systems, and the second field may include fields related to HE systems. In this case, a fast Fourier transform (FFT) size/inverse fast Fourier transform (IFFT) size may be defined as N (N is a natural number, for example, N=1, 2, 4) times an FFT/IFFT size used in legacy WLAN systems. That is, FFT/IFFT having a size N(=4) times a size of FFT/IFFT applied to the first field of the HE PPDU can be applied to the second field of the HE PPDU. For example, 256 FFT/IFFT can be applied to a bandwidth of 20 MHz, 512 FFT/IFFT can be applied to a bandwidth of 40 MHz, 1024 FFT/IFFT can be applied to a bandwidth of 80 MHz, and 2048 FFT/IFFT can be applied to a bandwidth of continuous 160 MHz or discontinuous 160 MHz.

In other words, a subcarrier spacing may be 1/N times (N is a natural number, for example, 78.125 kHz when N=4) a subcarrier spacing used in legacy WLAN systems. That is, a subcarrier spacing having a size of 312.5 kHz that is a legacy subcarrier spacing can be applied to the first field/part of the HE PPDU, and a subcarrier spacing having a size of 78.125 kHz can be applied to the second field/part of the HE PPDU.

Alternatively, an IDFT/DFT period applied to each symbol of the first field may be N(=4) times shorter than an IDFT/DFT period applied to each data symbol of the second field. That is, the IDFT/DFT period applied to each symbol of the first field of the HE PPDU may be 3.2 μs and the IDFT/DFT period applied to each symbol of the second field of the HE PPDU may be 3.2 μs*4 (=12.8 μs). An OFDM symbol length may be a value obtained by adding a guard interval (GI) length to an IDFT/DFT length. The GI length may have various values such as 0.4 μs, 0.8 μs, 1.6 μs, 2.4 μs, and 3.2 μs.

The technical feature in which different subcarrier spacings are applied to one PPDU can be applied to the HT-PPDU as it is. That is, a subcarrier spacing of 312.5 kHz can be applied to a first field/part of the EHT-PPDU and a subcarrier spacing of 78.125 kHz can be applied to a second field/part of the EHT-PPDU. The first field/part of the EHT-PPDU may include an L-LTF, an L-STF, an L-SIG, EHT-SIG-A, and/or EHT-SIG-B. In addition, the second field/part of the EHT-PPDU may include an EHT-STF, an EHT-LTF, and/or a data field. Division of the first part/second part of the EHT-PPDU may be changed.

Hereinafter, a resource unit (RU) used in the PPDU will be described. The resource unit may include a plurality of subcarriers (or tones). The resource unit can be used when signals are transmitted to a plurality of STAs on the basis of OFDMA. Furthermore, the resource unit may be defined when a signal is transmitted to a single STA. The resource unit can be used for the STF, the LTF, and the data field.

Figure 9:
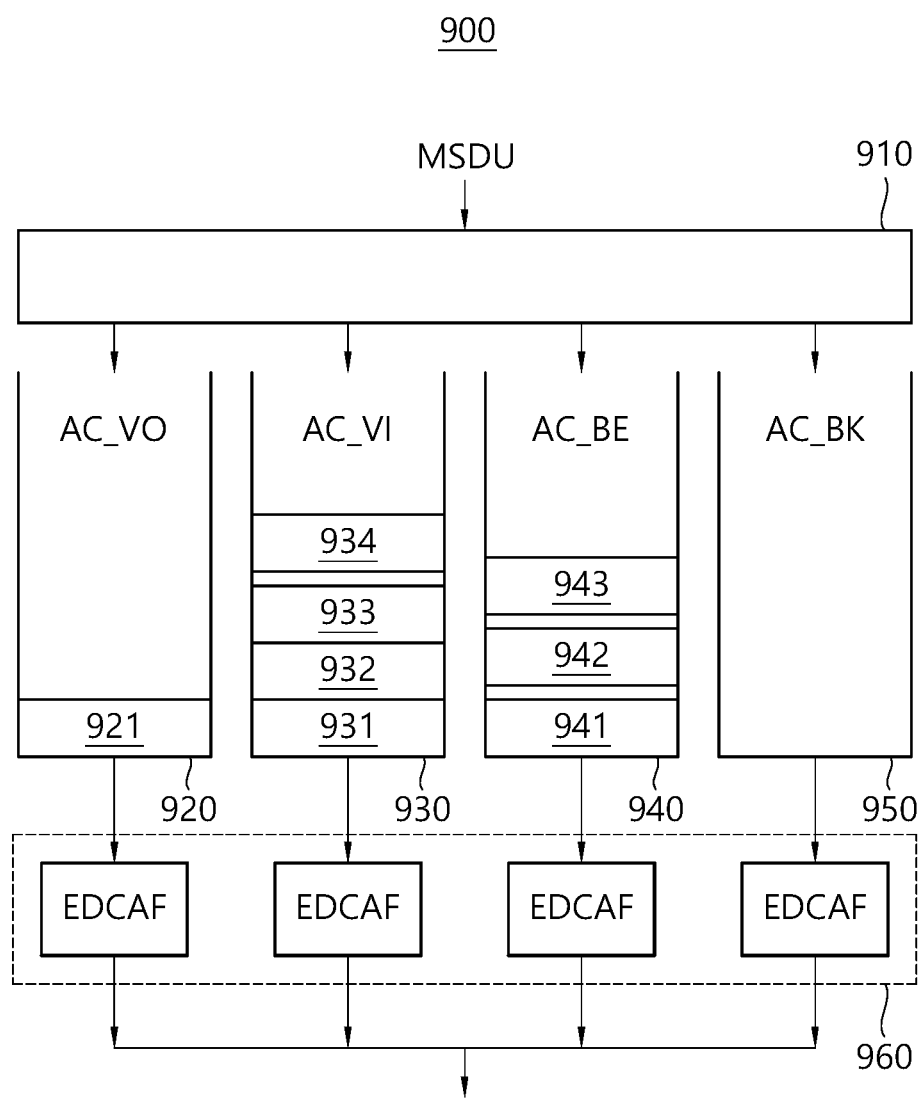
FIG. 9 illustrates a channel configuration in a 2.4 GHz band available in a WLAN system.

FIG. 9 is a diagram illustrating a channel access method based on EDCA. In a wireless LAN system, an STA may perform channel access based on a plurality of user priorities defined for enhanced distributed channel access (EDCA).

Specifically, for the transmission of a quality of service (QoS) data frame based on a plurality of user priorities, four access categories (ACs) (AC_BK (background), AC_BE (best effort), AC_VI (video), and AC_VO (voice)) may be defined.

An STA may receive, from a higher layer, traffic data (e.g., MAC service data unit (MSDU)) having a preset user priority.

For example, in order to determine the transmission sequence of a MAC frame to be transmitted by an STA, a differential value may be set in a user priority for each traffic data. The user priority may be mapped based on each access category (AC) in which traffic data is buffered and Table 1 below.

TABLE 1

| Priority | User priority | Access category (AC) |
|---|---|---|
| Low | 1 | AC_BK |
|  | 2 | AC_BK |
|  | 0 | AC_BE |
|  | 3 | AC_BE |
|  | 4 | AC_VI |
|  | 5 | AC_VI |
|  | 6 | AC_VO |
| High | 7 | AC_VO |

In the disclosure, the user priority may be understood as a traffic identifier (hereinafter "TID") indicating the characteristics of traffic data. Referring to Table 1, traffic data having the user priority (i.e., TID) of "1" or "2" may be buffered in a transmission queue 950 of an AC_BK type. Traffic data having the user priority (i.e., TID) of "0" or "3" may be buffered in a transmission queue 940 of an AC_BE type. Traffic data having the user priority (i.e., TID) of "4" or "5" may be buffered in a transmission queue 930 of an AC_VI type. Traffic data having the user priority (i.e., TID) of "6" or "7" may be buffered in a transmission queue 920 of an AC_VO type.

Instead of a DCF interframe space (DIFS), CWmin, and CWmax that are parameters for a back-off operation/procedure based on the existing distributed coordination function (DCF), an arbitration interframe space (AIFS)[AC], CWmin [AC], CWmax[AC] and TXOP limit[AC] that are EDCA parameter sets may be used for a back-off operation/procedure of an STA performing EDCA.

A difference between transmission priorities of ACs may be implemented based on a differentiated EDCA parameter set. A default value of the EDCA parameter set (i.e., AIFS [AC], CWmin[AC], CWmax[AC], and TXOP limit[AC]) corresponding to each AC is illustratively shown in Table 2. Detailed values of Table 2 may be set differently from those listed below.

TABLE 2

| AC | CWmin[AC] | CWmax[AC] | AIFS[AC] | TXOP limit[AC] |
|---|---|---|---|---|
| AC_BK | 31 | 1023 | 7 | 0 |
| AC_BE | 31 | 1023 | 3 | 0 |
| AC_VI | 15 | 31 | 2 | 3.008 ms |
| AC_VO | 7 | 15 | 2 | 1.504 ms |

The EDCA parameter set for each AC may be set as a default value or may be included in a beacon frame and transmitted from an access point (AP) to each STA. The smaller the values of the AIFS [AC] and the CWmin[AC], the higher the priorities. Accordingly, a more band can be used in a given traffic environment because channel access latency is reduced. The EDCA parameter set may include information on a channel access parameter (e.g., AIFS [AC], CWmin[AC], and CWmax[AC]) for each AC. A back-off operation/procedure for EDCA may be performed based on an EDCA parameter set individually set in each of the four ACs included in each STA. Proper setting of an EDCA parameter value that defines a different channel access parameter for each AC can optimize network performance and also increase a transmission effect based on the priority of traffic.

Accordingly, in a wireless LAN system, an AP needs to perform an overall management and coordination function on the EDCA parameters in order to guarantee fair medium access for all STAs participating in a network.

Referring to FIG. 9, one STA (or AP) 900 may include a virtual mapper 910, the plurality of transmission queues 920~950 and a virtual collision processor 960. In FIG. 9, the virtual mapper 910 may function to map an MSDU, received from a logical link control (LLC) layer, onto a transmission queue corresponding to each AC based on Table 1.

In FIG. 9, each of the plurality of transmission queues 920~950 may play a role of an EDCA contention entity for wireless medium access within one STA (or AP).

Figure 10:
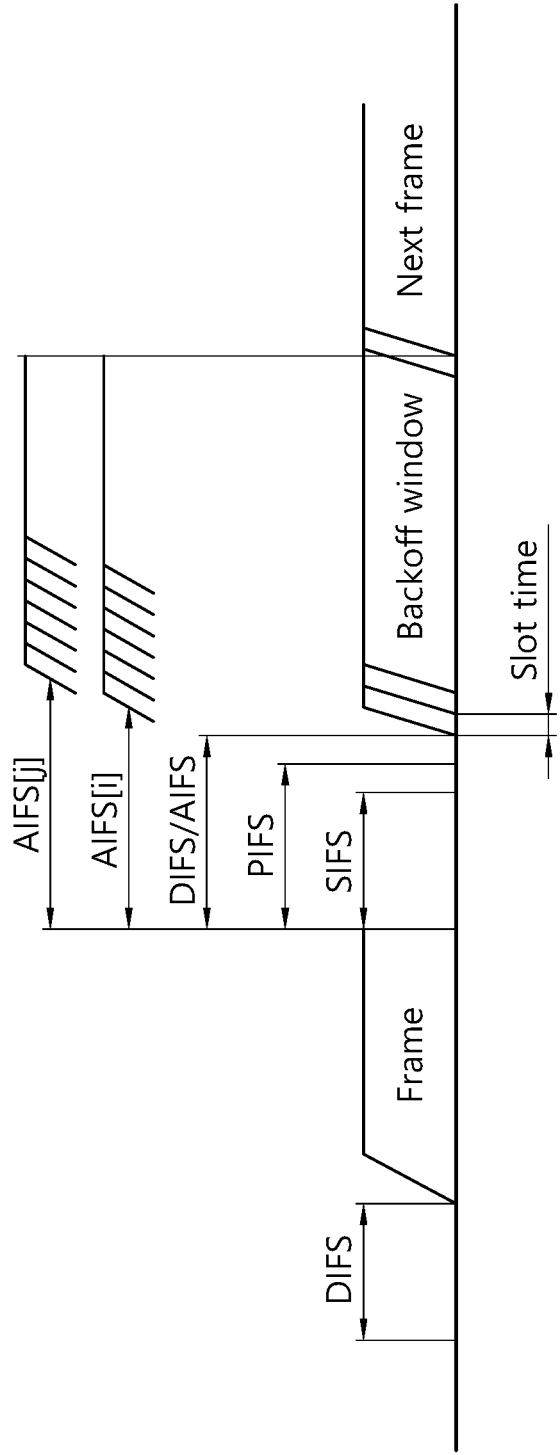
FIG. 10 illustrates a channel configuration in a 5 GHz band available in a WLAN system.

FIG. 10 is a concept view illustrating a back-off operation/procedure of EDCA.

A plurality of STAs may share a wireless medium based on a DCF, that is, a contention-based function. The DCF may use CSMA/CA in order to coordinate a collision between STAs.

In a channel access scheme using the DCF, if a medium is not used (i.e., channel is idle) during a DCF interframe space (DIFS), an STA may transmit an internally determined MPDU. The DIFS is a kind of time length used in the IEEE standard. The IEEE standard uses various time intervals, such as a slot time, a short inter-frame space (SIFS), a PCF inter-frame space (PIFS), a DIFS, and an arbitration inter-frame space (AIFS). A detailed value of each of the time intervals may be variously set. In general, a long length is set in order of the slot time, SIFS, PIFS, DIFS, and AIFS.

If it is determined that a wireless medium is used by another STA based on the carrier sensing mechanism of an STA (i.e., channel is busy), the STA may determine the size of a contention window (hereinafter "CW") and perform a back-off operation/procedure.

In order to perform a back-off operation/procedure, each STA may set a randomly selected back-off value in a back-off counter within a CW.

Each STA may perform a back-off operation/procedure for channel access by counting down a back-off window in a slot time unit. An STA that has selects a relatively shorter back-off window among a plurality of STAs may obtain a transmission opportunity (hereinafter "TXOP") capable of occupying a medium.

During a time interval for the TXOP, the remaining STAs may suspend countdown operations. The remaining STAs may wait until the time interval for the TXOP is ended. After the time interval for the TXOP is ended, the remaining STAs may resume the suspended countdown operations in order to occupy the wireless medium.

Based on a transmission method based on such a DCF, a collision phenomenon which may occur when a plurality of STAs transmits frames at the same time can be prevented. In this case, a channel access scheme using the DCF does not have a concept for a transmission priority (i.e., user priority). That is, when the DCF is used, quality of service (QoS) of traffic to be transmitted by an STA cannot be guaranteed.

In order to solve such a problem, in 802.11e, a hybrid coordination function (hereinafter "HCF"), that is, a new coordination function, has been defined. The newly defined HCF has better performance than channel access performance of the existing DCF. The HCF may use both HCF-controlled channel access (HCCA) of the polling scheme and contention-based enhanced distributed channel access (EDCA), that is, two types of channel access schemes, for QoS improvement purposes.

Referring to FIG. 10, it is assumed that an STA performs EDCA for the transmission of traffic data buffered in the STA. Referring to Table 1, a user priority set in each traffic data may be differentiated into eight stages.

Each STA may include output queues of the four types (AC_BK, AC_BE, AC_VI, and AC_VO) mapped onto the eight-stage user priorities of Table 1.

IFSs, such as the SIFS, the PIFS, and the DIFS, are additionally described below.

The IFS may be determined based on the attributes specified by the physical layer of an STA regardless of the bit rate of the STA. The remainder except the AIFS among the interframe spacings (IFSs) may fixedly use a value preset for each physical layer.

As illustrated in Table 2, the AIFS may be set as a value corresponding to the transmission queues of the four types mapped onto user priorities.

The SIFS has the shortest time gap among the aforementioned IFSs. Accordingly, the SIFS may be used when an STA occupying a wireless medium needs to maintain the occupancy of the medium without the interruption of another STA in an interval in which a frame exchange sequence is performed.

That is, a priority may be assigned when an on-going frame exchange sequence is completed using the smallest gap between transmissions within the frame exchange sequence. Furthermore, an STA accessing a wireless medium using the SIFS may immediately start transmission in an SIFS boundary without determining whether the medium is busy.

Duration of the SIFS for a specific physical (PHY) layer may be defined based on an aSIFSTime parameter. For example, an SIFS value is 11 µs in the physical layer (PHY) of the IEEE 802.11a, IEEE 802.11g, IEEE 802.11n and IEEE 802.11ac standards.

The PIFS may be used to provide an STA with a high priority next the SIFS. That is, the PIFS may be used to obtain a priority for accessing a wireless medium.

The DIFS may be used by an STA that transmits a data frame (MPDU) and a management frame (Mac protocol data unit (MPDU) based on the DCF. After a received frame and a back-off time expires, if a medium is determined to be in the idle state through a carrier sense (CS) mechanism, the STA may transmit the frame.

Figure 11:
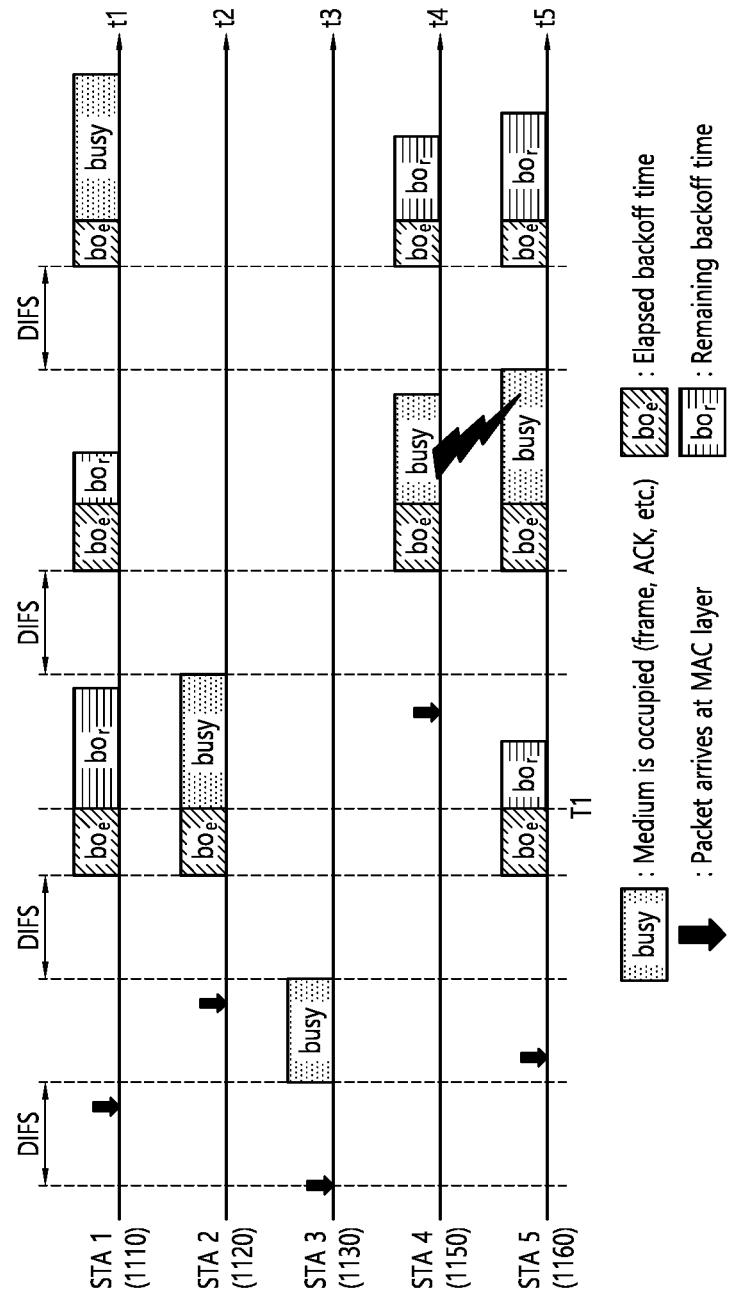
FIG. 11 is a view for describing a backoff operation.

FIG. 11 is a diagram describing a back-off operation.

Each of STAs 1110, 1120, 1130, 1140, and 1150 may select a back-off value for a back-off operation/procedure. Furthermore, each STA may attempt transmission after waiting as much as time (i.e., a back-off window) in which the selected back-off value is indicated in a slot time slot time unit. Furthermore, each STA may count down a back-off window in a slot time unit. A countdown operation for channel access to a wireless medium may be individually performed by each STA.

Time corresponding to the back-off window may be described as a random back-off time $T_b[i]$. In other words, each STA may individually set the back-off time $T_b[i]$ in the back-off counter of each STA.

Specifically, the back-off time $T_b[i]$ is a pseudo-random integer value, and may be computed based on Equation 1.

$$T_b[i] = \text{Random}(i) * \text{SlotTime} \qquad \text{[Equation 1]}$$

In Equation 1, Random(i) is a function using a uniform distribution and generating a given integer between 0 and CW[i]. CW[i] may be understood as a contention window selected between a minimum contention window CWmin[i] and a maximum contention window CWmax[i]. The minimum contention window CWmin[i] and the maximum contention window CWmax[i] may correspond to CWmin[AC] and CWmax[AC], that is, default values in Table 2.

In initial channel access, an STA may select a given integer between 0 and CWmin[i] through Random(i) with CW[i] being fixed to CWmin[i]. In the present embodiment, the selected given integer may be described as a back-off value.

i may be understood as the user priority of traffic data. In Equation 1, i may be construed as corresponding to any one of AC_VO, AC_VI, AC_BE or AC_BK according to Table 1.

In Equation 1, the slot time SlotTime may be used to provide a sufficient time so that the preamble of a transmission STA is sufficiently detected by an adjacent STA. In Equation 1, the slot time SlotTime may be used to define the aforementioned PIFS and DIFS. For example, the slot time SlotTime may be 9 μs.

For example, when a user priority(i) is "7", an initial back-off time Tb[AC_VO] for the transmission queue of the AC_VO type may be time in which a back-off value selected between 0 and CWmin[AC_VO] is represented in unit of the slot time SlotTime.

If a collision between STAs occurs according to a back-off operation/procedure (or if an ACK frame for a transmitted frame is not received), an STA may compute an increased back-off time Tb[i]' based on Equation 2 below.

$$CW_{new}[i]=((CWold[i]+1)*PF)-1 \qquad \text{[Equation 2]}$$

Referring to Equation 2, a new contention window $CW_{new}[i]$ may be computed based on a previous window $CW_{old}[i]$. In Equation 2, the PF value may be computed according to a procedure defined in the IEEE 802.11e standard. For example, in Equation 2, the PF value may be set to "2."

In the present embodiment, the increased back-off time Tb[i]' may be understood as time in which a given integer (i.e., a back-off value) selected between 0 and the new contention window $CW_{new}[i]$ is represented in a slot time unit.

The CWmin[i], CWmax[i], AIFS[i] and PF values described in FIG. 11 may be signaled from an AP through a QoS parameter set element, that is, a management frame. The CWmin[i], CWmax[i], AIFS[i] and PF values may be values preset by an AP and an STA.

Referring to FIG. 11, if the state of a specific medium changes from an occupy (or busy) state to an idle state, a plurality of STAs may attempt data (or frame) transmission. In this case, as a scheme for minimizing a collision between the STAs, each STA may select a back-off time back-off time Tb[i] in Equation 1, may wait for a slot time corresponding to the selected back-off time back-off, and may then attempt transmission.

When a back-off operation/procedure is initiated, each STA may individually count down the selected back-off counter time in a slot time unit. Each STA may continuously monitor the medium during the countdown.

If the state of the wireless medium is monitored as the occupancy state, the STA may suspend the countdown and may wait. If the state of the wireless medium is monitored as the idle state, the STA may resume the countdown.

Referring to FIG. 11, when a frame for the third STA 1130 reaches the MAC layer of the third STA 1130, the third STA 1130 may check whether the state of a medium is the idle state during a DIFS. Next, if the state of the medium is determined to be the idle state during the DIFS, the third STA 1130 may transmit the frame.

While the frame is transmitted by the third STA 1130, the remaining STAs may check the occupancy state of the medium and wait for the transmission interval of the frame. The frame may reach the MAC layer of each of the first STA 1110, the second STA 1120 and the fifth STA 1160. If the state of the medium is checked as the idle state, each STA may wait for the DIFS and then count down an individual back-off time selected by each STA.

FIG. 11 illustrates a case where the second STA 1120 has selected the smallest back-off time and the first STA 1110 has selected the greatest back-off time. FIG. 11 illustrates a case where at timing T1 at which frame transmission is started after a back-off operation/procedure for a back-off time selected by the second STA 1120 is terminated, the remaining back-off time of the fifth STA 1160 is shorter than the remaining back-off time of the first STA 1110.

When the medium is occupied by the second STA 1120, the first STA 1110 and the fifth STA 1160 may suspend the back-off operation/procedures and may wait. Next, when the medium occupancy of the second STA 1120 is ended (i.e., when the state of the medium becomes the idle state again), the first STA 1110 and the fifth STA 1160 may wait as much as the DIFS.

Next, the first STA 1110 and the fifth STA 1160 may resume the back-off operation/procedures based on the suspended remaining back-off time. In this case, since the remaining back-off time of the fifth STA 1160 is shorter than the remaining back-off time of the first STA 1110, the fifth STA 1160 may complete the back-off operation/procedure before the first STA 1110.

Meanwhile, referring to FIG. 11, when the medium is occupied by the second STA 1120, a frame for the fourth STA 1150 may reach the MAC layer of the fourth STA 1150. When the state of the medium becomes the idle state, the fourth STA 1150 may wait as much as the DIFS. Next, the fourth STA 1150 may count down a back-off time selected by the fourth STA 1150.

Referring to FIG. 11, the remaining back-off time of the fifth STA 1160 may coincide with the back-off time of the fourth STA 1150. In this case, a collision occurs between the fourth STA 1150 and the fifth STA 1160. When the collision between the STAs occurs, both the fourth STA 1150 and the fifth STA 1160 do not receive ACK and may fail in data transmission.

Accordingly, the fourth STA 1150 and the fifth STA 1160 may individually compute new contention windows $CW_{new}[i]$ according to Equation 2. Next, the fourth STA 1150 and the fifth STA 1160 may individually perform countdown on the back-off times newly computed according to Equation 2.

Meanwhile, when the state of the medium is the occupancy state due to the transmission of the fourth STA 1150 and the fifth STA 1160, the first STA 1110 may wait. Next, when the state of the medium becomes the idle state, the first STA 1110 may wait as much as the DIFS and then resume back-off counting. When the remaining back-off time of the first STA 1110 elapses, the first STA 1110 may transmit the frame.

An STA (AP and/or non-AP STA) of the present disclosure can support multi-link communication. The STA supporting multi-link communication can simultaneously perform communication through a plurality of links. That is, STA supporting multi-link communication can perform communication through a plurality of links for a first time period and perform communication through only any one of the plurality of links for a second time period.

Multi-link communication may mean communication supporting a plurality of links, and a link may include a channel (e.g., 20/40/80/160/240/320 MHz channel) defined in a 2.4 GHz band, a 5 GHz band, a 6 GHz band, and/or a specific band which will be described below. Hereinafter, various bands and channels will be described.

Figure 12:
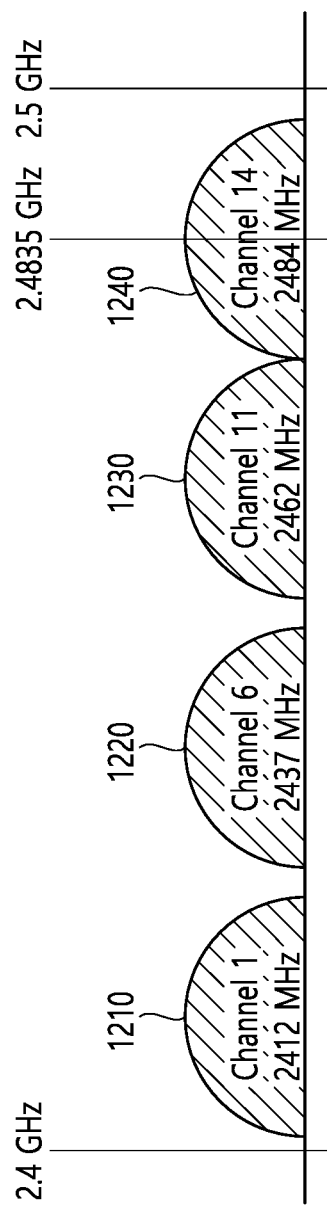
FIG. 12 illustrates an example of channels used/supported/defined in a 2.4 GHz band.

FIG. 12 illustrates an example of channels used/supported/defined in a 2.4 GHz band.

The 2.4 GHz band may be called other names such as a first band. Further, the 2.4 GHz band may mean a frequency domain in which channels having center frequencies close to 2.4 GHz (e.g., channels having center frequencies within 2.4 to 2.5 GHz) are used/supported/defined.

The 2.4 GHz band may include a plurality of 20 MHz channels. The 20 MHz channels in the 2.4 GHz band may have a plurality of channel indexes (e.g., index 1 to index 14). For example, the center frequency of a 20 MHz channel to which channel index 1 is allocated may be 2.412 GHz, the center frequency of a 20 MHz channel to which channel index 2 is allocated may be 2.417 GHz, and the center frequency of a 20 MHz channel to which channel index N is allocated may be (2.407+0.005*N) GHz. A channel index may be called other names such as a channel number. Specific numerical values of channel indexes and center frequencies may be changed.

FIG. 12 illustrates four channels in the 2.4 GHz band. Each of the illustrated first to fourth frequency domains 1210 to 1240 may include a single channel. For example, the first frequency domain 1210 may include channel #1 (20 MHz channel having index #1). Here, the center frequency of channel #1 may be set to 2412 MHz. The second frequency domain 1220 may include channel #6. Here, the center frequency of channel #6 may be set to 2437 MHz. The third frequency domain 1230 may include channel #11. Here, the center frequency of channel #11 may be set to 2462 MHz. The fourth frequency domain 1240 may include channel #14. Here, the center frequency of channel #14 may be set to 2484 MHz.

Figure 13:
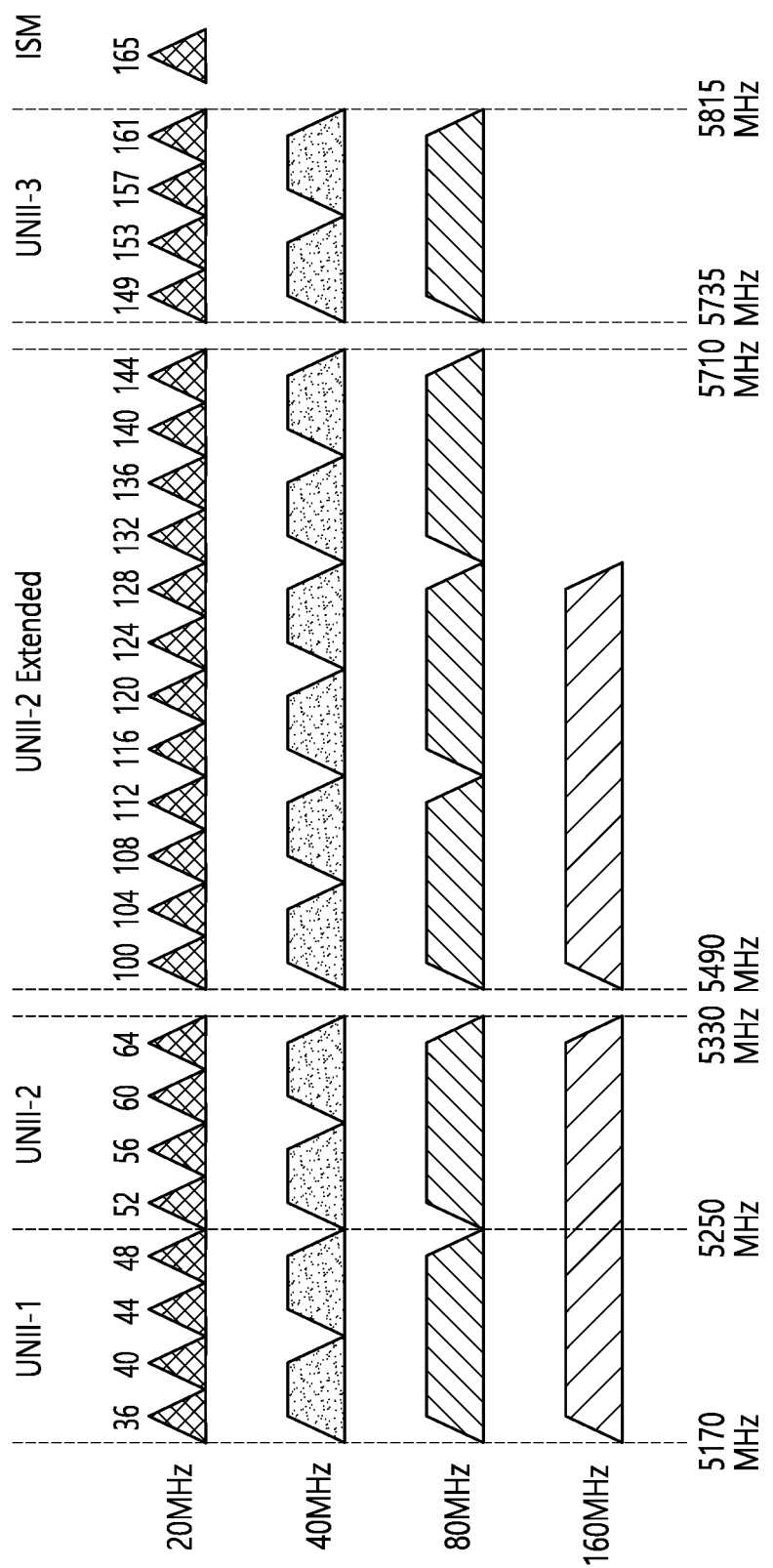
FIG. 13 illustrates an example of channels used/supported/defined in a 5 GHz band.

FIG. 13 illustrates an example of channels used/supported/defined in a 5 GHz band.

The 5 GHz band may be called other names such as a second band. The 5 GHz band may mean a frequency domain in which channels having center frequencies of 5 GHz or higher and less than 6 GHz (or less than 5.9 GHz) are used/supported/defined. Otherwise, the 5 GHz band may include a plurality of channels in a range of 4.5 GHz to 5.5 GHz. Specific numerical values illustrated in FIG. 13 may be changed.

A plurality of channels in the 5 GHz band includes UNII (Unlicensed National Information Infrastructure)-1, UNII-2, UNII-3, and ISM. UNII-1 may also be called UNII Low. UNII-2 may include frequency domains called UNII Mid and UNII-2Extended. UNII-3 may be called UNII-Upper.

A plurality of channels may be set in the 5 GHz band, and a bandwidth of each channel may be set to 20 MHz, 40 MHz, 80 MHz, or 160 MHz in various manners. For example, a frequency domain/range of 5170 MHz to 5330 MHz in UNII-1 and UNII-2 may be divided into eight 20 MHz channels. The frequency domain/range of 5170 MHz to 5330 MHz may be divided into four channels through a 40 MHz frequency domain. The frequency domain/range of 5170 MHz to 5330 MHz may be divided into two channels through an 80 MHz frequency domain. Alternatively, the frequency domain/range of 5170 MHz to 5330 MHz may be defined as a single channel through a 160 MHz frequency domain.

Figure 14:
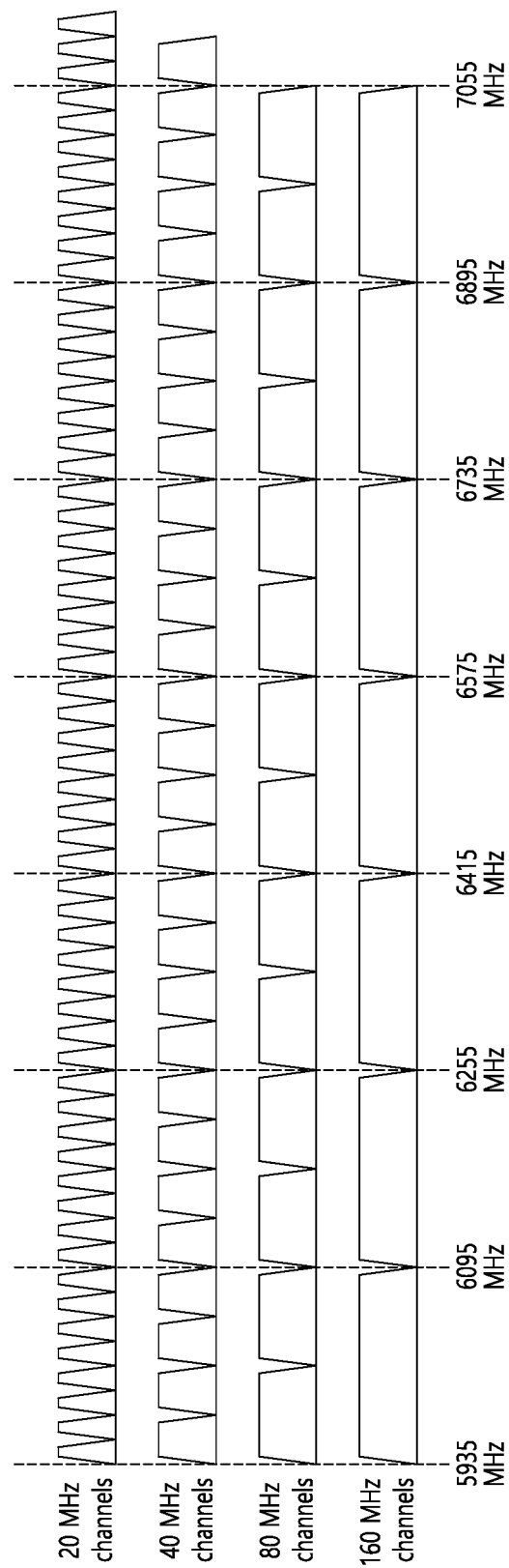
FIG. 14 illustrates an example of channels used/supported/defined in a 6 GHz band.

FIG. 14 illustrates an example of channels used/supported/defined in a 6 GHz band.

The 6 GHz band may be called other names such as a third band. The 6 GHz band may mean a frequency domain in which channels having center frequencies of 5.9 GHz or higher are used/supported/defined. Specific numerical values illustrated in FIG. 14 may be changed.

For example, a 20 MHz channel in FIG. 14 may be defined from 5.940 GHz.

Specifically, the leftmost channel among 20 MHz channels of FIG. 14 may have index #1 (or channel index #1, channel number #1, or the like) and a center frequency of 5.945 GHz may be allocated thereto. That is, a center frequency of a channel with index #N may be determined as (5.940+0.005*N) GHz.

Accordingly, indexes (or channel numbers) of 20 MHz channels in FIG. 14 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, and 233. Further, indexes of 40 MHz channels in FIG. 20 may be 3, 11, 19, 27, 35, 43, 51, 59, 67, 75, 83, 91, 99, 107, 115, 123, 131, 139, 147, 155, 163, 171, 179, 187, 195, 203, 211, 219, and 227 according to the above-described (5.940+0.005*N) GHz rule.

Although 20, 40, 80, and 160 MHz channels are illustrated in the example of FIG. 14, 240 MHz channels or 320 MHz channels may be added.

Hereinafter, the concept of conventional channel bonding will be described.

For example, in an IEEE 802.11n system, two 20 MHz channels may be combined and thus 40 MHz channel bonding may be performed. In an IEEE 802.11ac system, 40/80/160 MHz channel bonding may be performed.

For example, an STA may perform channel bonding with respect to a primary 20 MHz channel (P20 channel) and a secondary 20 MHz channel (S20 channel). A backoff counter/counter may be used in a channel bonding process. A backoff count value may be selected as a random value and may decrease in a backoff interval. When a backoff count value becomes 0, the STA can attempt to access a channel, in general.

The STA performing channel bonding determines whether the S20 channel has been maintained in an idle state for a specific period (e.g., point coordination function interframe space (PIFS)) at a point in time at which a backoff count value for the P20 channel becomes 0 upon determining that the P20 channel is in an idle state for a backoff interval. If the S20 channel is in an idle state, the STA can perform bonding of the P20 channel and the S20 channel. That is, the STA can transmit a signal (PPDU) through a 40 MHz channel (i.e., 40 MHz bonded channel) including the P20 channel and the S20 channel.

Figure 15:
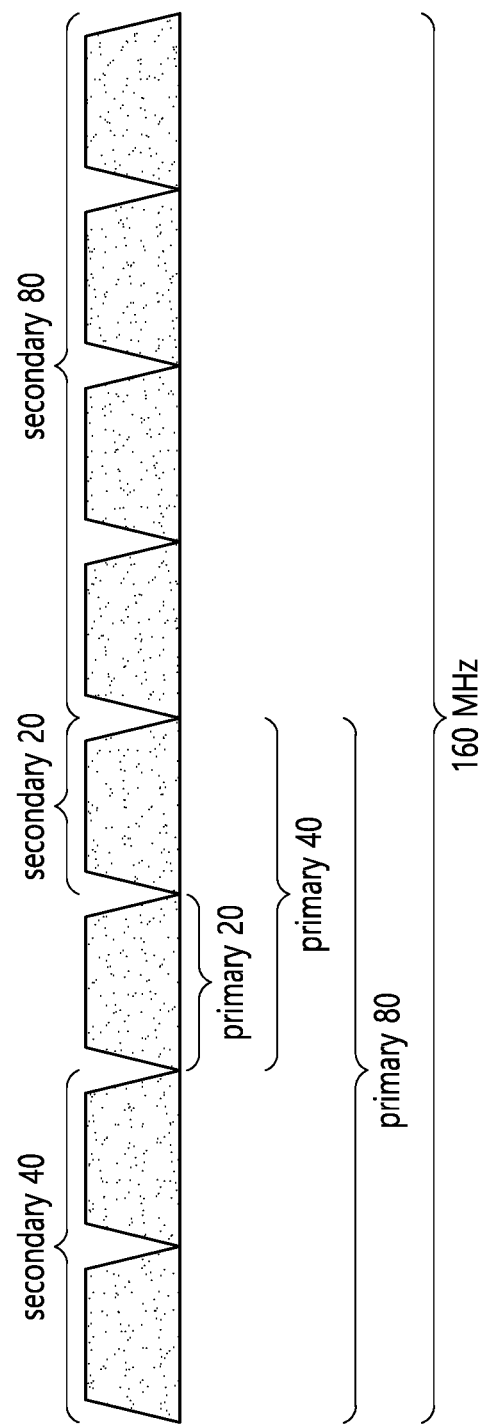
FIG. 15 illustrates an example of channel bonding.

FIG. 15 illustrates an example of channel bonding.

As illustrated in FIG. 15, a primary 20 MHz channel and a secondary 20 MHz channel may construct a 40 MHz channel (primary 40 MHz channel) through channel bonding. That is, the bonded 40 MHz channel can include the primary 20 MHz channel and the secondary 20 MHz channel.

Channel bonding can be performed when a channel consecutive to a primary channel is in an idle state. That is, a primary 20 MHz channel, a secondary 20 MHz channel, a secondary 40 MHz channel, and a secondary 80 MHz channel may be sequentially bonded. If the secondary 20 MHz channel is determined to be busy, channel bonding may not be performed even if all of other secondary channels are idle. Further, when it is determined that the secondary 20 MHz channel is idle and the secondary 40 MHz channel is busy, channel bonding may be performed only on the primary 20 MHz channel and the secondary 20 MHz channel.

Hereinafter, technical features with respect to multiple links and aggregation will be described.

An STA (AP and/or non-AP STA) of the present disclosure can support multi-link communication. That is, the STA can simultaneously transmit and receive signals through a first link and a second link on the basis of a multi-link. That is, the multi-link may refer to a technique by which an STA simultaneously transmits and receives signals through a plurality of links. For example, transmission of a signal through a certain link and reception of a signal through another link can also be included in multi-link communication. An STA supporting multi-link may use a plurality of links in a first time period and use only one link in a second time period.

Figure 16:
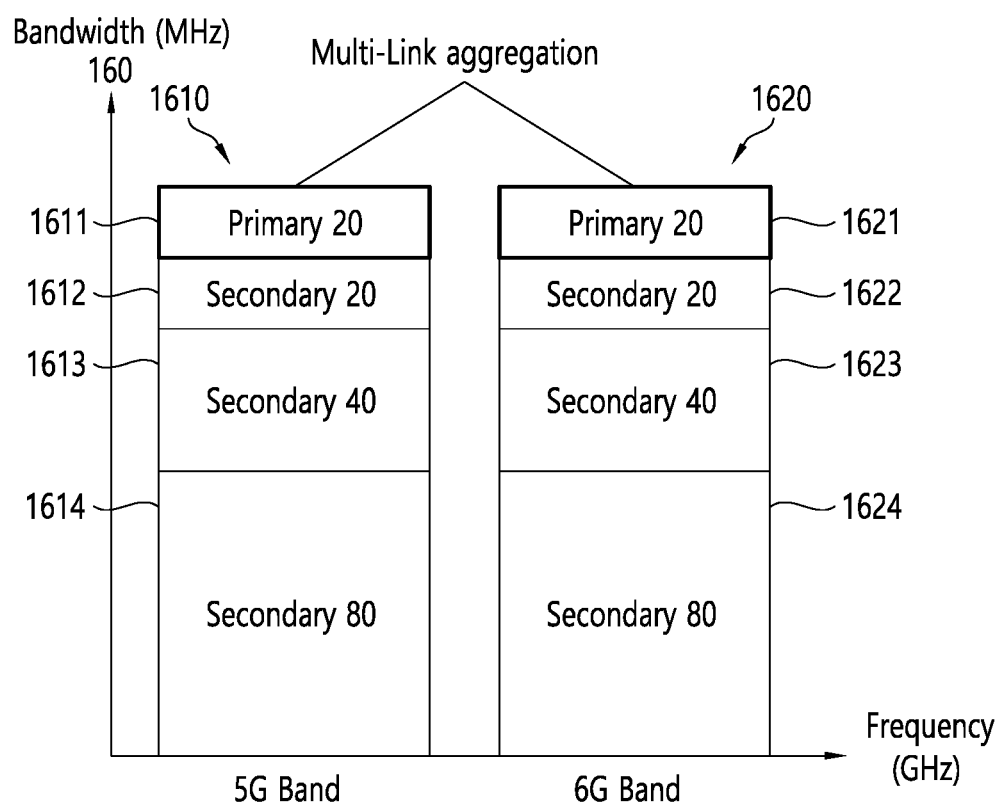
FIG. 16 is a view for describing technical features of links used for "a multi-link".

FIG. 16 is a view for describing technical features of links used for multi-link.

Links used for multi-link may have at least one of the following technical features. Features with respect to links described below are exemplary and additional technical features are applicable.

For example, links used for multi-link may be included in different bands. That is, when multi-link supporting first and second links is used, each of the first and second links is included in a 2.4 GHz band, a 5 GHz band, or a 6 GHz band, but the first and second links may be included in different bands.

Referring to FIG. 16, the first link 1610 and the second link 1620 may be used for multi-link. The first link 1610 of FIG. 16 may be included in a 5 GHz band, for example. The second link 1620 of FIG. 16 may be included in a 6 GHz band, for example.

Links used for multi-link may be included in the same band. For example, when multi-link supporting first/second/third links is used, all links may be included in the same band, or the first/second links may be included in a first band and the third link may be included in a second band.

Multi-link may be configured on the basis of different RF modules (e.g., IDFT/IFFT blocks). Additionally or alternatively, a plurality of links included in multi-link may be nonconsecutive in a frequency domain. That is, a frequency gap may be present between a frequency domain corresponding to the first link among a plurality of links and a frequency domain corresponding to a second link.

As illustrated in FIG. 16, the first link 1610 may include a plurality of channels 1611, 1612, 1613, and 1614. An STA can apply conventional channel bonding to the plurality of channels 1611, 1612, 1613, and 1614. That is, when the plurality of channels 1611, 1612, 1613, and 1614 are idle for a specific time period (e.g., for PIFS), the plurality of channels 1611, 1612, 1613, and 1614 can be configured as a single bonded channel, and the single bonded channel can operate as the single link 1610. Alternatively, some (e.g., 1611, 1612, and 1614) of the plurality of channels 1611, 1612, 1613, and 1614 may operate as the single link 1610 through preamble puncturing newly proposed in the IEEE 802.11ax standard. The aforementioned features can be equally applied to the second link 1620.

An upper limit may be set to the number (and/or a maximum bandwidth) of channels included in a single link used for multi-link. For example, a maximum of four channels can configure a single link as in the example of FIG. 16. Additionally or alternatively, a maximum bandwidth of a single link may be 160 MHz, 240 MHz, or 320 MHz. Additionally or alternatively, a single link may include only consecutive channels. The aforementioned specific numerical values may be changed.

A procedure for identifying/specifying/determining links used for multi-link relates to an aggregation (or channel aggregation) procedure. An STA may aggregate a plurality of links to perform multi-link communication. That is, the STA can perform 1) a first procedure for identifying/specifying/determining links aggregated for multi-link and 2) a second procedure for performing multi-link communication through identified/specified/determined links. The STA may separately or simultaneously perform the first procedure and the second procedure.

Hereinafter, technical features of the first procedure will be described.

An STA can transmit/receive information about a plurality of links configuring multi-link. For example, an AP can transmit identification information about bands for which multi-link capability is supported and/or identification information about channels for which multi-link capability is supported through a beacon, a probe response, an association response, and other control frames. For example, when the AP can aggregate some channels in a 5 GHz band and some channels in a 6 GHz band and then perform communication through the aggregated channels, the AP can transmit identification about the channels that can be aggregated to a user STA.

For example, the user STA can also transmit identification information about bands for which multi-link capability is supported and/or identification information about channels for which multi-link capability is supported through a probe request, an association response, and other control frames. For example, when the user STA can aggregate some channels in a 5 GHz band and some channels in a 6 GHz band and then perform communication through the aggregated channels, the user STA can transmit identification about the channels that can be aggregated to the AP.

Any one of a plurality of links configuring multi-link may operate as a primary link. The primary link can execute various functions. For example, an STA can perform aggregation of other links when a backoff value of the primary link is 0 (and/or when the primary link is idle for PIFS). Such information about the primary link may also be included in the beacon, the probe request/response, and association request/response.

The user-STA/AP can specify/determine/acquire bands and/or channels for multi-link communication through a negotiation procedure for exchanging information about their capability.

For example, the STA can specify/determine/acquire a first candidate band/channel that can be used for the first link, a second candidate band/channel that can be used for the second link, and a third candidate band/channel that can be used for the third link through the negotiation procedure.

Then, the STA can perform a procedure for identifying/specifying/determining links aggregated for multi-link. For example, the STA can aggregate at least two bands/channels on the basis of backoff counts and/or clear channel assessment (CCA) sensing results (busy/idle) of the first candidate band/channel, the second candidate band/channel, and the third candidate band/channel. For example, the STA can aggregate the second candidate band/channel that has been maintained in an idle state for a specific period (for PIFS) at a point in time at which the backoff count value of the first candidate band/channel is 0. That is, the STA can determine/specify the first candidate band/channel as the first link for multi-link, determine/specify the second candidate band/channel as the second link for multi-link, and perform multi-link communication through the first and second links.

Hereinafter, technical features of the second procedure will be described.

For example, when the STA determines that the first and second links are aggregated, the STA can perform multi-link communication through the first and second links. For example, the STA may transmit PPDUs having the same length through both the first and second links. Alternatively, the STA may receive a transmitting PPDU through the first link and receive a receiving PPDU through the second link for an overlap time period. The STA may perform communication through all the aggregated links in a specific time period and use only one link in other time periods.

In the following example, an STA can set a network allocation vector (NAV) for a specific band (or specific link). NAVs may be divided into an intra-BSS NAV and an overlapping BSS (OBSS) NAV. The OBSS NAV may also be called a basic NAV.

The intra-BSS NAV may be set on the basis of an intra-BSS frame (or packet). Frames/packets received by an STA may be divided into an intra-BSS frame and an OBSS frame. The intra-BSS frame is a frame received through an intra-BSS and may be a frame generated in a BSS to which an STA (i.e., a receiving STA) that receives the frame belongs. On the other hand, the OBSS frame (or inter-BSS frame) may be a frame received from a BSS (e.g., a neighboring BSS) to which the receiving STA does not belong.

The receiving STA may determine whether a received frame is an intra-BSS frame or an OBSS frame on the basis of a specific field (e.g., a BSS color ID included in an HE-SIG-A field) included in the received frame. For example, the receiving STA may set an intra-BSS NAV on the basis of a duration field (e.g., a duration/ID field included in a MAC header) or a TXOP field (e.g., a TXOP field included in HE-SIG-A) of the frame determined to be an intra-BSS frame. In addition, the receiving STA may set an OBSS NAV (i.e., basic NAV) on the basis of the duration field (e.g., the duration/ID field included in the MAC header) or the TXOP field (e.g., the TXOP field included in HE-SIG-A) of the frame determined to be an OBSS frame.

The receiving STA that sets two NAVs can use at least one of the set two NAVs for a following transmission operation (e.g., UL-MU).

Hereinafter, the present disclosure proposes an example in which an STA sets a NAV on the basis of a signal received from a transmitting STA. Specifically, the transmitting STA may aggregate links through a backoff procedure for each primary channel of each link and transmit signals (or data) at the time of multi-link aggregation. Here, links for transmission of the transmitting STA may be links included in all bands supported by STAs or some of bands supported by the transmitting STA. The transmitting STA can aggregate all links including a primary link. The transmitting STA can transmit signals (or data) through the all aggregated links. In this case, a receiving STA and/or a third party device can perform a reception operation or a NAV setting operation in the same manner as a case where multi-link signal reception is not performed. However, when the transmitting STA aggregates only some links and transmits a first signal (or data), the first signal may collide with a second signal (or data) transmitted from the receiving STA operating in a link that is not aggregated. Hereinafter, a method of setting a NAV by a receiving STA when a transmitting STA aggregates only some links and transmits a signal is proposed.

Figure 17:
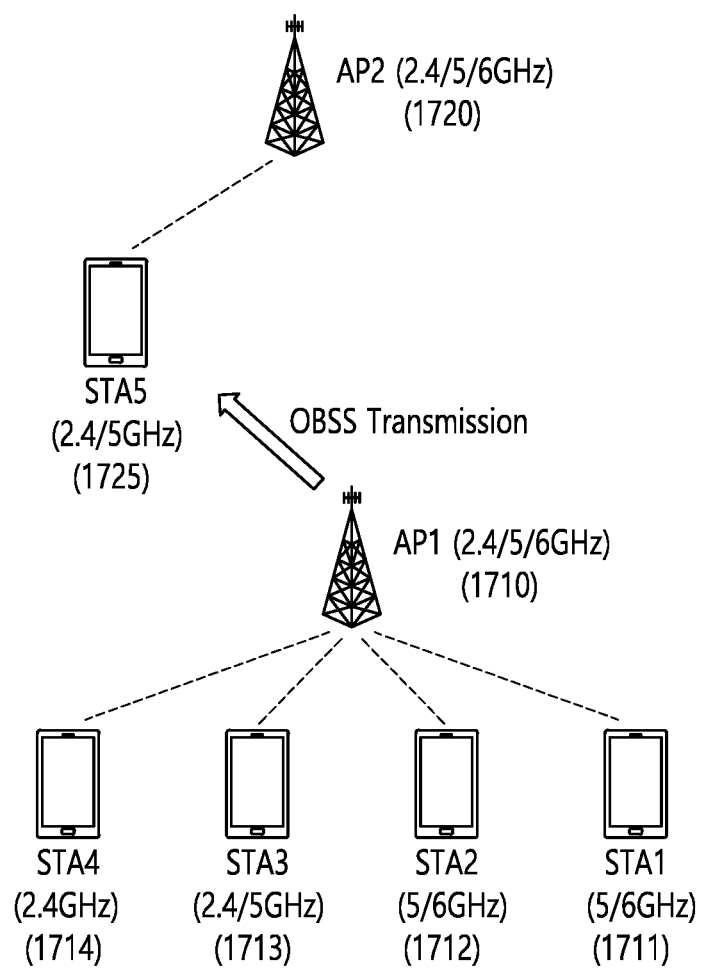
FIGS. 17 and 18 are diagrams for describing an example in which collision occurs in a multi-link operation.
Figure 18:
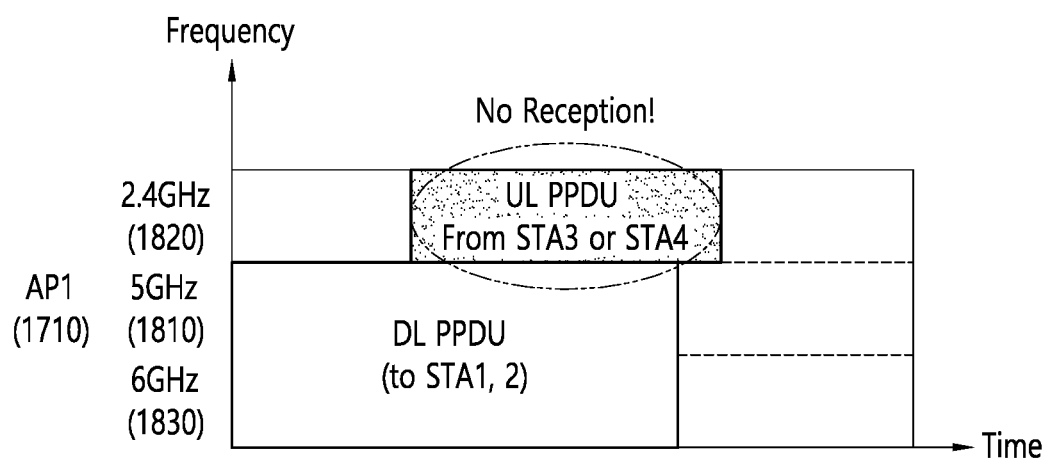

FIG. 17 and FIG. 18 are diagrams for describing an example in which collision occurs in a multi-link operation.

The transmitting STA (or AP) can support a plurality of frequency bands. The receiving STA can support at least one of the plurality of frequency bands supported by the transmitting STA. The transmitting STA and the receiving STA can constitute a BSS. The transmitting STA can configure a multi-link through at least one of the plurality of frequency bands. That is, the transmitting STA (or AP) can aggregate at least two of a plurality of links to configure a multi-link. While the transmitting STA transmits a signal (e.g., a PPDU) through the multi-link, at least one STA connected to the transmitting STA may transmit a signal through a link that is not aggregated. The transmitting STA may not identify the signal received through the link that is not aggregated because it transmits the signal through the multi-link. When the signal is transmitted through the link that is not aggregated, the transmitting STA cannot receive the signal and thus resources may be wasted. Hereinafter, the aforementioned problem will be described using a specific example with reference to FIG. 17 and FIG. 18.

Referring to FIG. 17 and FIG. 18, AP1 1710, STA1 1711, STA2 1712, STA3 1713, and STA4 1714 may constitute a first BSS. AP2 1720 and STA5 1725 may constitute a second BSS (or OBSS). For example, AP1 1710 may support 2.4 GHz, 5 GHz and/or 6 GHz bands. STA1 1711, STA2 1712, STA3 1713, or STA4 1714 may include an STA supporting at least one of 2.4 GHz, 5 GHz, and 6 GHz bands. For example, STA1 1711 may support 5 GHz and/or 6 GHz bands. STA2 1712 may support 5 GHz and/or 6 GHz bands. STA3 1713 may support 2.4 GHz and/or 5 GHz bands. STA4 1714 may support a 2.4 GHz band. AP2 1720 may support 2.4 GHz, 5 GHz, and/or 6 GHz band. STA5 1725 may support 2.4 GHz and/or 5 GHz bands.

AP1 1710 may support a first link 1810, a second link 1820, and/or a third link 1830. For example, the first link 1810 may be included in the 5 GHz band. The second link 1820 may be included in the 2.4 GHz band. The third link 1830 may be included in the 6 GHz band.

AP1 1710 may configure a multi-link for transmitting signals (hereinafter, downlink (DL) signals) to STA1 1711 and STA2 1712. AP1 1710 may determine whether primary channels of the first link 1810, the second link 1820, and/or the third link 1830 are idle. AP1 1710 may determine that the primary channel of the second link 1820 is busy. AP1 1710 may determine that the primary channels of the first link 1810 and the third link 1830 are idle. AP1 1710 may specify the first link 1810 and the third link 1830 as links to be aggregated. AP1 1710 may transmit a DL signal (e.g., DL PPDU) to STA1 1711 and STA2 1712 through the aggregated first and second links 1810 and 1830. Here, AP1 1710 may not receive a signal (hereinafter an uplink (UL) signal) transmitted from STA3 1713 or STA4 1714 through the second link 1820 while transmitting the DL signal to STA1 1711 and STA2 1712 because AP1 1710 cannot simultaneously perform transmission and reception. AP1 1710 may not receive the UL signal (e.g., UL PPDU) because it is transmitting the DL signal. Since AP1 1710 cannot receive the UL signal, resources may be wasted. Accordingly, a method for reducing such resource waste may be required.

STA3 1713 supporting the 2.4 GHz band or the 5 GHz band may recognize a DL signal transmitted through the first link 1810 of the 5 GHz band. However, STA4 1714 supporting the 2.4 GHz band may not recognize a DL signal transmitted through the first link 1810 or the third link 1830. STA5 1725 that is an OBSS STA can recognize a DL signal from AP1 1710 because it supports the 5 GHz band. Accordingly, different solutions for STAs may be required. For reference, an intra-BSS NAV set in a BSS to which an STA belongs and a basic NAV set in a BSS (or OBSS) to which an STA does not belong may be set for each link (or band).

Hereinafter, technical features proposed by the present disclosure to solve the aforementioned problems in response to STAs will be described.

A method of setting a NAV by an STA will be described according to three cases. In CASE 1, a method of setting a NAV in the case of a third party STA in the same BSS which recognizes signal transmission (e.g., STA3 1713 of FIG. 17) will be described. In CASE 2, a method of setting a NAV in the case of a third party STA in the same BSS which does not recognize signal transmission (e.g., STA4 1714 of FIG. 17) will be described. In CASE 3, a method of setting a NAV in the case of an STA included in an OBSS (e.g., STA5 1725 of FIG. 17) will be described.

For clear and brief description, the following three cases will be described using a transmitting STA (or AP), a first STA, a second STA, a third STA, and a fourth STA.

In the following example, "a link (e.g., first/second/third link)" may include any channel (20/40/80/160/240/320 MHz channel) on any band (e.g., any one of 2.4 GHz, 5 GHz, and 6 GHz). For example, the first link may include one of channels on the 5 GHz band. The second link 2 link may include one of channels on the 2.4 GHz band. The third link may include one of channels on the 6 GHz band.

The transmitting STA (e.g., AP1 1710 in FIG. 17) can support the first to third links. The first STA (e.g., STA3 1713 in FIG. 17) can support the first and second links. The second STA (e.g., STA2 1712 in FIG. 17) can support the first and third links. The third STA (e.g., STA4 1714 in FIG. 17) can support the second link. The fourth STA (e.g., STA5 1725 in FIG. 17) can support the first and second links. The transmitting STA, the first STA, the second STA, and the third STA may constitute a single BSS. The fourth STA may be included in an OBSS. The transmitting STA may transmit a first signal (e.g., PPDU) to the second STA through aggregated first and third links. In this case, operations of the first to fourth STAs to set a NAV may be proposed according to each case.

CASE 1: a case where a third party station (e.g., the first STA or the third STA of the same BSS) recognizes the first signal (e.g., PPDU) transmitted from the transmitting STA CASE 1 relates to an operation performed in the third party STA when the third party STA can recognize/detect the first signal. That is, CASE 1 may relate to the operation of the first STA. The third party STA may support a multi-link (or band). The third party STA may be an STA other than a target STA to which a signal is transmitted from the transmitting STA. The third party STA may receive a packet (i.e., intra-BSS packet) from the BSS to which it belongs. Accordingly, the third party STA can acquire an intra-BSS NAV value of a link from which the packet is detected. In addition, the third party STA may set the acquired intra-BSS NAV value to the same value as an intra-BSS NAV value for which no packet is detected.

For example, the first STA can receive a PPDU generated for the second STA from the transmitting STA through the first link. The first STA can acquire information related to a NAV on the basis of the PPDU. The information related to the NAV may include information about a NAV value. The first STA can set a first type NAV for the first link according to the NAV value. The first type NAV may include an intra-BSS NAV. The first STA can set a first type NAV for the second link to the same value as the NAV value.

Figure 19:
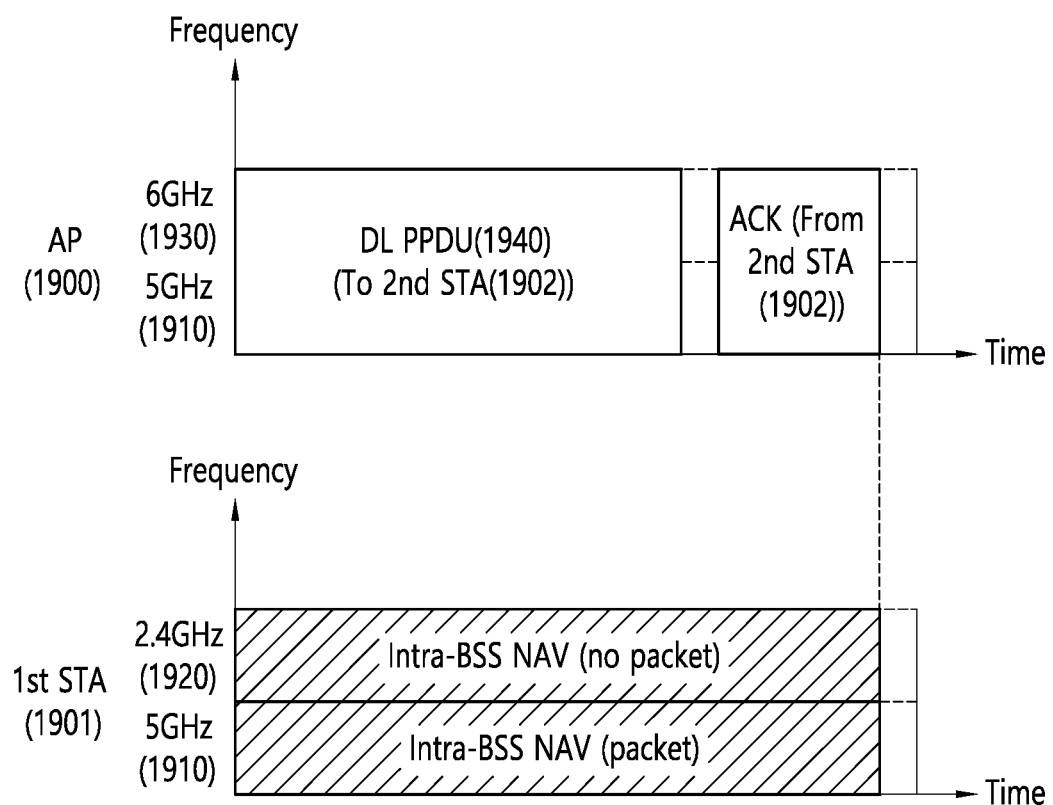
FIG. 19 illustrates an example in which an STA sets a NAV according to CASE 1.

FIG. 19 illustrates an example in which an STA sets a NAV according to CASE 1.

FIG. 19 illustrates a specific example of CASE 1. Referring to FIG. 19, an AP 1900 can specify links to be aggregated from among a first link 1910 to a third link 1930 in order to transmit a PPDU 1940 to a second STA 1902. The AP 1900 can specify the first link 1910 and the third link 1930 as links to be aggregated on the basis of backoff count (BC) values and/or clear channel assessment (CCA) sensing results (busy/idle) of the first link 1910 to the third link 1930.

For example, the AP 1900 may determine that a CCA sensing result of the second link 1920 is a busy state and CCA sensing results of the first link 1910 and the third link 1930 are an idle state. Accordingly, the AP 1900 can specify the first link 1910 and the third link 1930 as links to be aggregated.

As another example, the AP 1900 can aggregate the first link 1910 and the third link 1930 when BC values of primary channels (e.g., primary 20 MHz channels) of the first link 1910 and the third link 1930 are a first value (e.g., {0}) and/or when the primary channels are idle for a PIFS.

The AP 1900 can transmit the PPDU 1940 to the second STA 1902 through the aggregated first and third links 1910 and 1930. The PPDU may include information for setting the first type NAV for the first link 1910. The first type NAV may include an intra-BSS NAV.

The first STA 1901 supports the first link 1910 and the second link 1920 and thus can receive the PPDU 1940 through the first link 1910. The first STA 1901 can check that the PPDU 1940 has been generated for the second STA 1902. The first STA 1901 can acquire a NAV value for the first link 1910 on the basis of a duration field of a MAC header frame or a signal field of a PHY header frame included in the PPDU 1940. For example, the signal field of the PHY header frame may include a SIG-A field (e.g., HE-SIG-A). The SIG-A field may include a TXOP field. For example, the first STA 1901 may acquire the NAV value for the first link 1910 on the basis of the TXOP field included in the SIG-A field of the PPDU 1940. The first STA 1901 can set the first type NAV for the first link 1910 on the basis of the NAV value.

The first STA 1901 can acquire a NAV value for the second link 1920 on the basis of the duration field of the MAC header frame or the signal field of the PHY header frame included in the PPDU 1940. For example, the signal field of the PHY header frame may include a SIG-A field (e.g., HE-SIG-A). The SIG-A field may include a TXOP field. For example, the first STA 1901 may acquire the NAV value for the second link 1920 on the basis of the TXOP field included in the SIG-A field of the PPDU 1940. The first STA 1901 can set the first type NAV for the second link 1920 on the basis of the NAV value. The first type NAV for the second link 1920 may include an intra-BSS NAV for the second link 1920.

The first STA 1901 may set the first type NAV for the second link 1920 to the same NAV value as the first type NAV for the first link 1910. Specifically, the first STA 1901 may set the first type NAV for the first link 1910 and then set the first type NAV for the second link 1920 to the same NAV value as the first type NAV for the first link 1910. A period length of the first type NAV for the second link 1920 may be set to be identical to a period length of the first type NAV for the first link 1910.

The first STA 1901 may not transmit a signal to the AP 1900 for a period in which the first STA 1901 is set to the first type NAV by setting the first type NAV for the first link 1910 and the first type NAV for the second link 1920.

Figure 20:
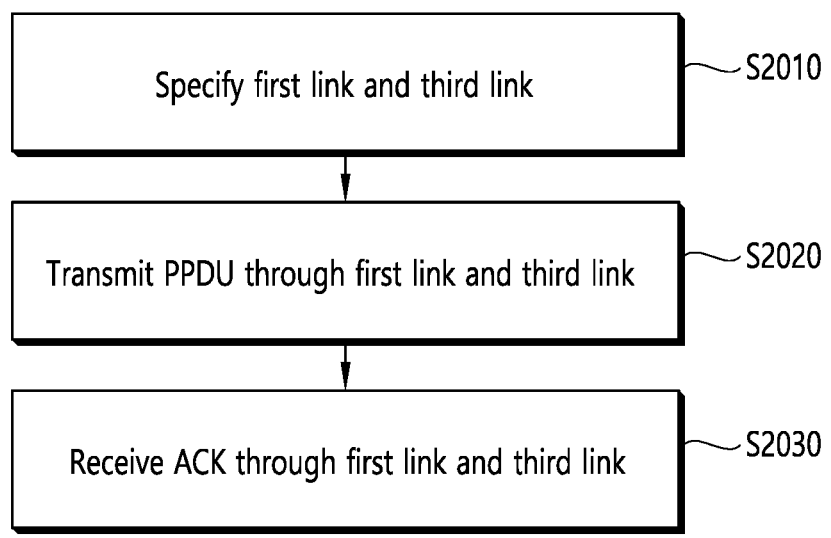
FIG. 20 is a flowchart for describing an example of an operation of a transmitting STA according to CASE 1.

FIG. 20 is a flowchart for describing an example of an operation of a transmitting STA according to CASE 1.

Referring to FIG. 20, a transmitting STA (e.g., AP 1900 in FIG. 19) may specify the first link and the third link in step S2010. Specifically, the transmitting STA may specify links to be aggregated from among the first to third links in order to transmit a PPDU to the second STA (e.g., the second STA 1902 in FIG. 19). The transmitting STA may specify the first link and the third link on the basis of BC values of the first link and the third link and/or CCA sensing results (busy/idle) of the first link and the third link through a backoff procedure. The transmitting STA can aggregate the first link and the third link.

In step S2020, the transmitting STA can transmit the PPDU through the first link and the third link. The PPDU may include information about a target STA (i.e., the second STA) that is a PPDU transmission target. In addition, the PPDU may include information about a TXOP or a NAV. For example, the duration field of the MAC header frame and/or the signal field of the PHY header frame included in the PPDU may include information about a NAV. The transmitting STA can transmit the PPDU in the same length in the first link and the third link.

In step S2030, the transmitting STA can receive ACK through the first link and the third link. The transmitting STA can receive ACK from the target STA (e.g., the second STA 1902 in FIG. 19) that is the PPDU transmission target in response to the PPDU. The transmitting STA can receive ACK through the aggregated first and third links.

Figure 21:
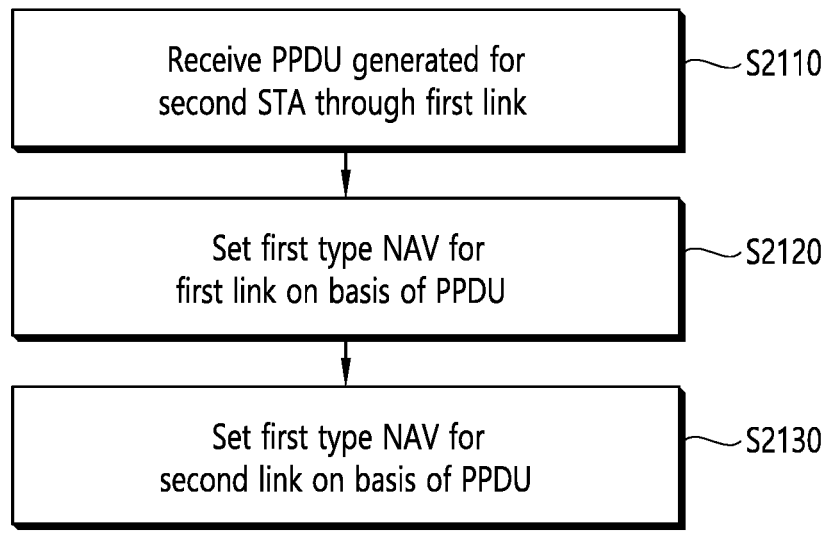
FIG. 21 is a flowchart for describing an example of an operation of a first STA according to CASE 1.

FIG. 21 is a flowchart for describing an example of an operation of a first STA according to CASE 1.

Referring to FIG. 21, the first STA (e.g., the first STA 1901 in FIG. 19) can receive a PPDU generated for the second STA (e.g., the second STA 1902 in FIG. 19) through the first link in step S2110. The first STA can support the first link and the second link. The PPDU can be transmitted through the aggregated first and third links. The first STA can receive the PPDU only through the first link in the aggregated first and third links. The first STA can check that the PPDU is transmitted to the second STA. The first link can be received through a first band. The second link can be received through a second band different from the first band.

In step S2120, the first STA can set the first type NAV for the first link on the basis of the PPDU. The PPDU may include information about a NAV. Specifically, the first STA can acquire a NAV value through the duration field of the MAC header frame included in the PPDU and/or the signal field included in the PPDU. For example, the signal field may include a SIG-A field (e.g., HE-SIG-A) and the SIG-A field may include a TXOP field. The first STA can set the first type NAV for the first link using the NAV value. The first type NAV for the first link may include an intra-BSS NAV for the first link.

In step S2130, the first STA can set the first type NAV for the second link on the basis of the PPDU. For example, the first STA can acquire a NAV value for the second link on the basis of the duration field of the MAC header frame or the signal field of the PHY header frame included in the PPDU. For example, the signal field of the PHY header frame may include a SIG-A field (e.g., HE-SIG-A). The SIG-A field may include a TXOP field. For example, the first STA can acquire the NAV value for the second link on the basis of the TXOP field included in the SIG-A field of the PPDU. The first STA can set the first type NAV for the second link on the basis of the NAV value. The first type NAV for the second link may include an intra-BSS NAV for the second link.

The first STA may set the first type NAV for the second link to the same NAV value as the first type NAV for the first link. A period length of the first type NAV for the second link may be set to be identical to a period length of the first type NAV for the first link.

The first STA may not transmit a signal to an STA distinguished from the first STA (e.g., AP 1900 in FIG. 19) for a period in which the first STA is set to the first type NAV by setting the first type NAV for the first link and the first type NAV for the second link.

CASE 2: a case where a third party STA in the same BSS does not recognize a first signal (e.g., PPDU) transmitted from a transmitting STA CASE 2 proposes an operation of the third party STA or the transmitting STA (or AP) when the third party STA can recognize/detect the first signal. That is, CASE 2 may relate to an operation of a third STA. The third party STA cannot recognize a signal (e.g., PPDU) transmitted through a link (or band) that is not supported thereby. Accordingly, in this case, a hidden band (link) problem may be generated.

For example, the third STA may not detect/recognize transmission of the first signal from the transmitting STA to the second STA through the first link and the third link because the third STA supports the second link. Accordingly, the third STA may transmit a signal to the transmitting STA while the transmitting STA transmits the first signal through the first link and the third link. The transmitting STA may not receive the signal from the third STA because the transmitting STA is transmitting the first signal. Accordingly, a method by which the third STA recognizes a signal transmitted from the transmitting STA may be required. As methods for solving this problem, CASE 2-1, 202, and/or 2-3 may be proposed. CASE 2-1 to 2-3 below may be applied to CASE 1.

CASE 2-1: a method of transmitting a CTS-to-self frame first, by a transmitting STA, before transmission of a first signal The transmitting STA can transmit a CTS-to-self frame through all bands (or links) supported thereby before transmission of a first signal (e.g., PPDU). The transmitting STA can notify other STAs (e.g., the first to third STAs) of presence of the first signal (e.g., PPDU) which will be transmitted through the CTS-to-self frame. The CTS-to-self frame may include information to distinguish a link (e.g., the first link and the third link) through which the first signal is transmitted after the CTS-to-self frame from a link (e.g., the second link) through which the first signal is not transmitted. Further, the CTS-to-self frame may include information related to a NAV to be set by a third party STA. The information related to the NAV may be included in the duration/ID field. The transmitting STA can transmit the CTS-to-self frame through all links supportable thereby such that an STA (e.g., a fourth STA) supporting only a link through which the first signal is not transmitted can also set a NAV.

The transmitting STA can determine a link through which the first signal will be transmitted through a backoff procedure. That is, the link through which the first signal will be transmitted may be a link determined to be idle through CCA and thus may be a link in a ready state for transmission of the first signal. Accordingly, the transmitting STA can additionally determine whether the link through which the first signal is not transmitted is idle for a designated period before transmission of the CTS-to-self frame. The designated period may include, for example, PIFS, AIFS, or one slot.

The transmitting STA can cause the third party STA to effectively set a NAV through the CTS-to-self frame. For example, the transmitting STA can cause all third party STAs to set a NAV when there is no hidden node. In addition, the transmitting STA can transmit the relatively short CTS-to-self frame before transmission of the first signal that is long due to data included therein to acquire TXOP.

For example, the transmitting STA can check that the second link is idle for a designated period (e.g., PIFS) before transmission of the first signal. The transmitting STA can transmit the CTS-to-self frame through all links (bands) supported thereby before transmission of the first signal. The third STA can acquire information about a transmission link of the first signal and/or information related to a NAV from the CTS-to-self frame. The third STA can set a first type NAV related to the length of a TXOP period in which the transmitting STA communicates with the second STA through the aggregated first and third links. The first type NAV may include an intra-BSS NAV. The third STA may not transmit a signal through the second link for the set first type NAV period.

Figure 22:
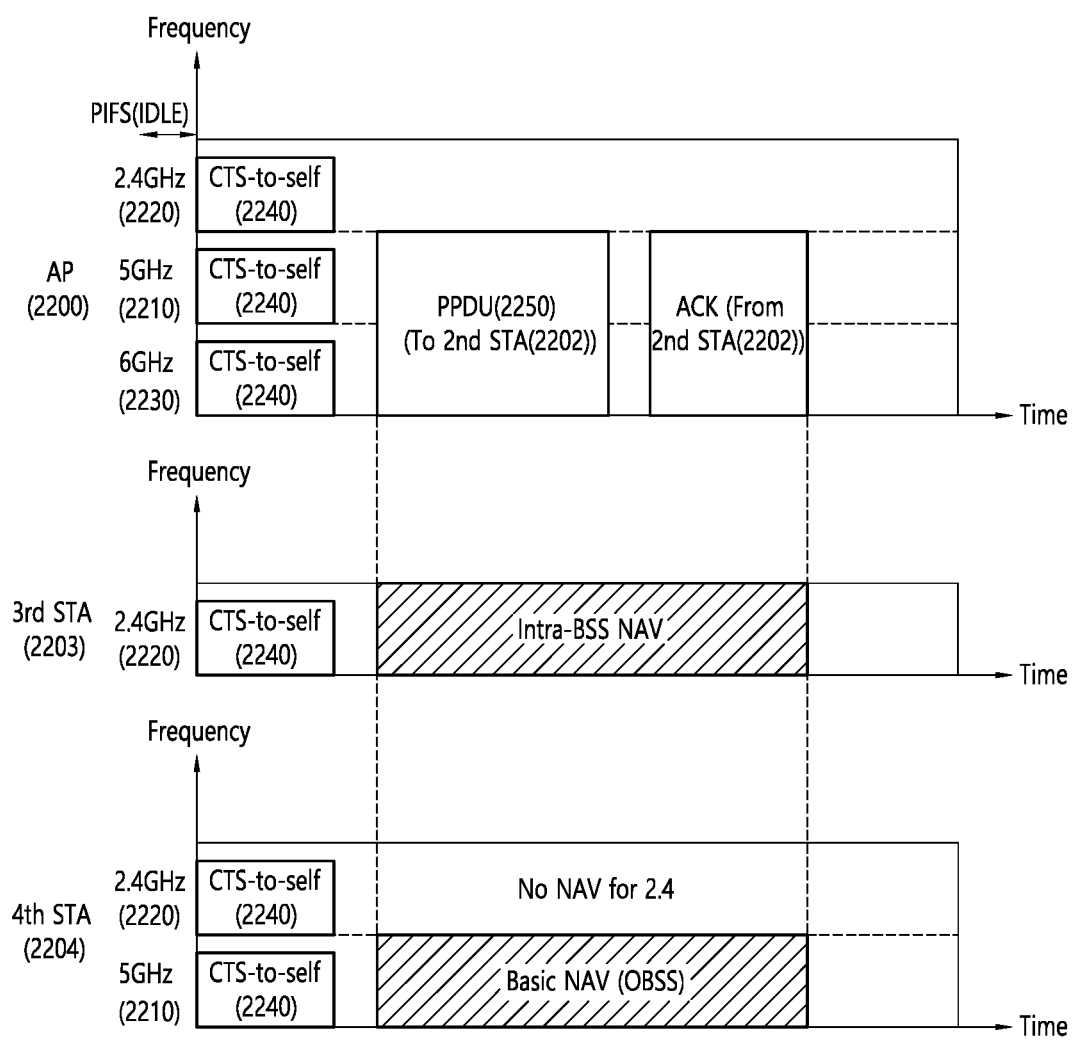
FIG. 22 illustrates an example in which an STA sets a NAV according to CASE 2-1.

FIG. 22 illustrates an example in which an STA sets a NAV according to CASE 2-1.

FIG. 22 illustrates a specific example of CASE 2-1. Referring to FIG. 22, an AP 2200 can specify links to be aggregated from among a first link 2210 to a third link 2230 in order to transmit a PPDU 2250 to a second STA 2202. The AP 2200 can specify the first link 2210 and the third link 2230 as links to be aggregated on the basis of backoff count (BC) values and/or clear channel assessment (CCA) sensing results (busy/idle) of the first link 2210 to the third link 2230.

The AP 2200 can determine whether the second link is idle for a designated period. The designated period may include, for example, PIFS, AIFS, or one slot. When the second link is idle for the designated period, the AP 2200 can transmit a CTS-to-self frame 2240 through all links (or bands) supportable thereby. That is, the AP 2200 can transmit the CTS-to-self frame 2240 through the first link 2210 to the third link 2230. Although the CTS-to-self frame 2240 is illustrated as a single frame, the CTS-to-self 2240 may include CTS-to-self frames independently transmitted through the first link to the third link. The CTS-to-self frame 2240 may include information about links (the first link 2210 and the third link 2230) through which the PPDU 2250 is transmitted and/or information about a NAV.

A third STA 2203 supporting a second link 2220 can receive the CTS-to-self frame 2240 through the second link 2220. The third STA 2203 can check that a PPDU 2250 which will be subsequently transmitted is for the second STA 2203. The third STA 2203 can acquire a NAV value on the basis of a duration/ID field of the CTS-to-self frame 2240. The third STA 2203 can set a first type NAV for the second link 2220 on the basis of the NAV value. The first type NAV may include an intra-BSS NAV.

Technical features with respect to an operation of a fourth STA 2204 will be separately described below.

Figure 23:
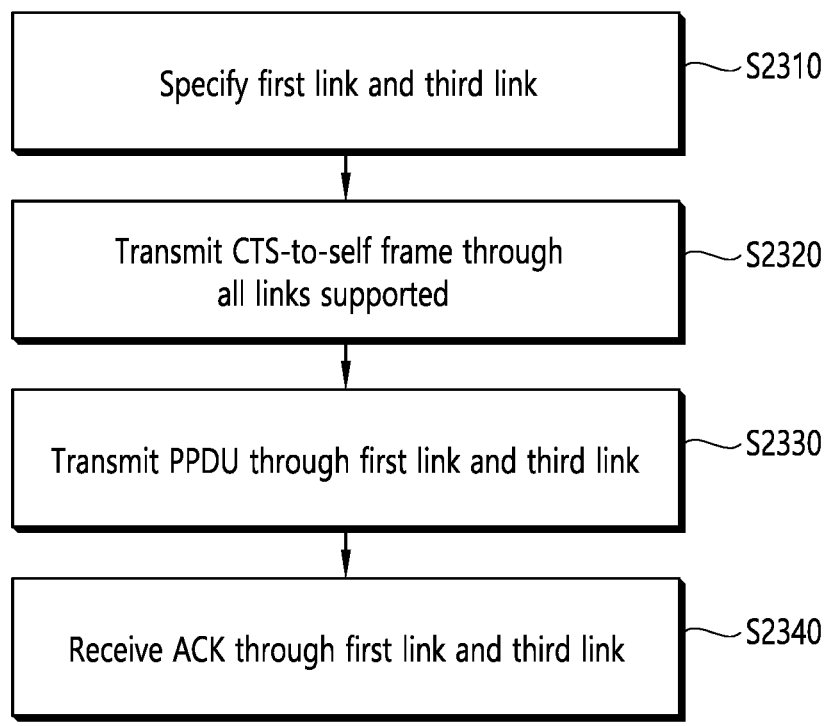
FIG. 23 is a flowchart for describing an example of an operation of a transmitting STA according to CASE 2-1.

FIG. 23 is a flowchart for describing an example of an operation of a transmitting STA according to CASE 2-1.

Referring to FIG. 23, a transmitting STA (e.g., AP 2200 in FIG. 22) can specify the first link and the third link in step S2310. Specifically, the transmitting STA can specify links to be aggregated from among the first to third links in order to transmit a PPDU to a second STA (e.g., the second STA 2202 in FIG. 22). The transmitting STA may specify the first link and the third link on the basis of BC values of the first link and the third link and/or CCA sensing results (busy/idle) of the first link and the third link through a backoff procedure. The transmitting STA can aggregate the first link and the third link.

In step S2320, the transmitting STA can transmit a CTS-to-self frame through all links supported thereby. The transmitting STA can determine whether the second link is idle for a designated period before transmission of the CTS-to-self frame. The designated period may include, for example, PIFS, AIFS, or one slot. When the second link is idle for the designated period, the transmitting STA can transmit the CTS-to-self frame through the first to third links. The CTS-to-self frame may include information about a target STA (i.e., the second STA) that is a PPDU transmission target. In addition, the CTS-to-self frame may include information about links (the first link and the third link) through which a PPDU will be transmitted and/or information about a NAV.

In step S2330, the transmitting STA can transmit the PPDU through the first link and the third link. The transmitting STA can transmit the PPDU to the second STA through the aggregated first and third links. The transmitting STA can transmit the PPDU in the same length in the first link and the third link.

In step S2340, the transmitting STA can receive ACK through the first link and the third link. The transmitting STA can receive ACK through the aggregated first and third links. The transmitting STA can receive ACK from the second STA in response to the PPDU.

Figure 24:
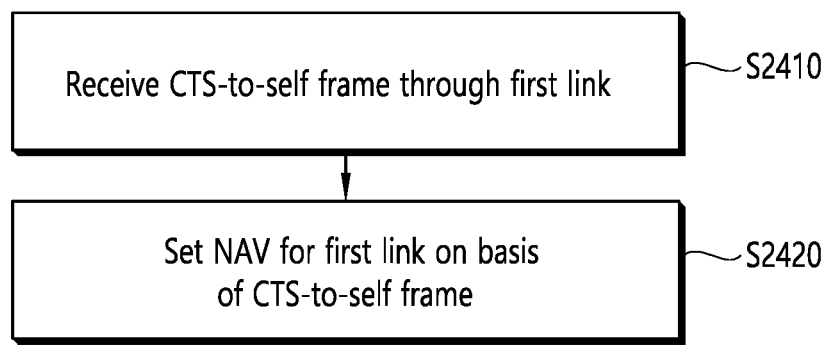
FIG. 24 is a flowchart for describing an example of an operation of a third STA according to CASE 2-1.

FIG. 24 is a flowchart for describing an example of an operation of a third STA according to CASE 2-1.

Referring to FIG. 24, the third STA (e.g., the third STA 2203 in FIG. 22) can receive a CTS-to-self frame through the first link in step S2410. The CTS-to-self frame can be transmitted through the aggregated first and third links. The third STA supporting only the first link can receive the CTS-to-self frame through the first link. The third STA can check that a PPDU which will be subsequently transmitted is a PPDU transmitted to the second STA (e.g., the second STA 2202 in FIG. 22).

In step S2420, the third STA can set the first type NAV for the first link on the basis of the CTS-to-self frame. The CTS-to-self frame may include information about links (the first link and the third links) through which the PPDU is transmitted and/or information about a NAV. For example, the third STA can acquire a NAV value on the basis of a duration/ID field of the CTS-to-self frame. The third STA can set the first type NAV for the first link on the basis of the NAV value. The first type NAV may include an intra-BSS NAV. For example, the third STA can set an intra-BSS NAV related to the length of a TXOP period in which the transmitting STA communicates with the second STA through the aggregated first and third links. The third STA may not transmit a signal through the second link for the set intra-BSS NAV period.

CASE 2-2: a method of transmitting a CTS-to-self frame along with a first signal by a transmitting STA The transmitting STA can transmit a CTS-to-self frame as in CASE 2-1. However, the transmitting STA can transmit a first signal (e.g., a PPDU) through a link for transmitting the first signal differently from CASE 2-1. At the same point in time, the transmitting STA can transmit the CTS-to-self frame through a link through which the first signal is not transmitted. The transmitting STA can transmit different signals (or frames) for respective links supported thereby.

The transmitting STA can determine a link through which the first signal will be transmitted through a backoff procedure. That is, the link through which the first signal will be transmitted may be a link determined to be idle through CCA and thus may be a link in a ready state for transmission of the first signal. Accordingly, the transmitting STA can determine whether the link through which the first signal is not transmitted is idle for a designated period before transmission of the CTS-to-self frame. The designated period may include, for example, PIFS, AIFS, or one slot.

The CTS-to-self frame may include information related to a NAV to be set by a third party STA. The information related to the NAV may be included in a duration/ID field. The transmitting STA can transmit the CTS-to-self frame through the link through which the first signal is not transmitted such that an STA (e.g., a fourth STA) supporting only the link through which the first signal is not transmitted sets a NAV.

The transmitting STA can cause a third party STA to effectively set a NAV through the CTS-to-self frame. For example, the transmitting STA can cause all third party STAs to set a NAV when there is no hidden node. In addition, the transmitting STA can transmit the relatively short CTS-to-self frame along with the first signal that is long due to data included therein to acquire (or secure) TXOP.

For example, when the transmitting STA transmits the first signal through the first link and the third link, the transmitting STA can check whether the first link is idle for a designated period (e.g., PIFS). The transmitting STA can transmit the first signal through the aggregated first and third links and transmit the CTS-to-self frame along with the first signal through the second link when the first link is idle for the designated period. The third STA can acquire information about a NAV from the CTS-to-self frame. The third STA can set an intra-BSS NAV for the second link. The third STA may not transmit a signal through the second link for the set intra-BSS NAV period. For example, the third STA can set an intra-BSS NAV related to the length of a TXOP period in which the transmitting STA communicates with the second STA through the aggregated first and third links. The third STA may not transmit a signal through the first link for the set intra-BSS NAV period.

Figure 25:
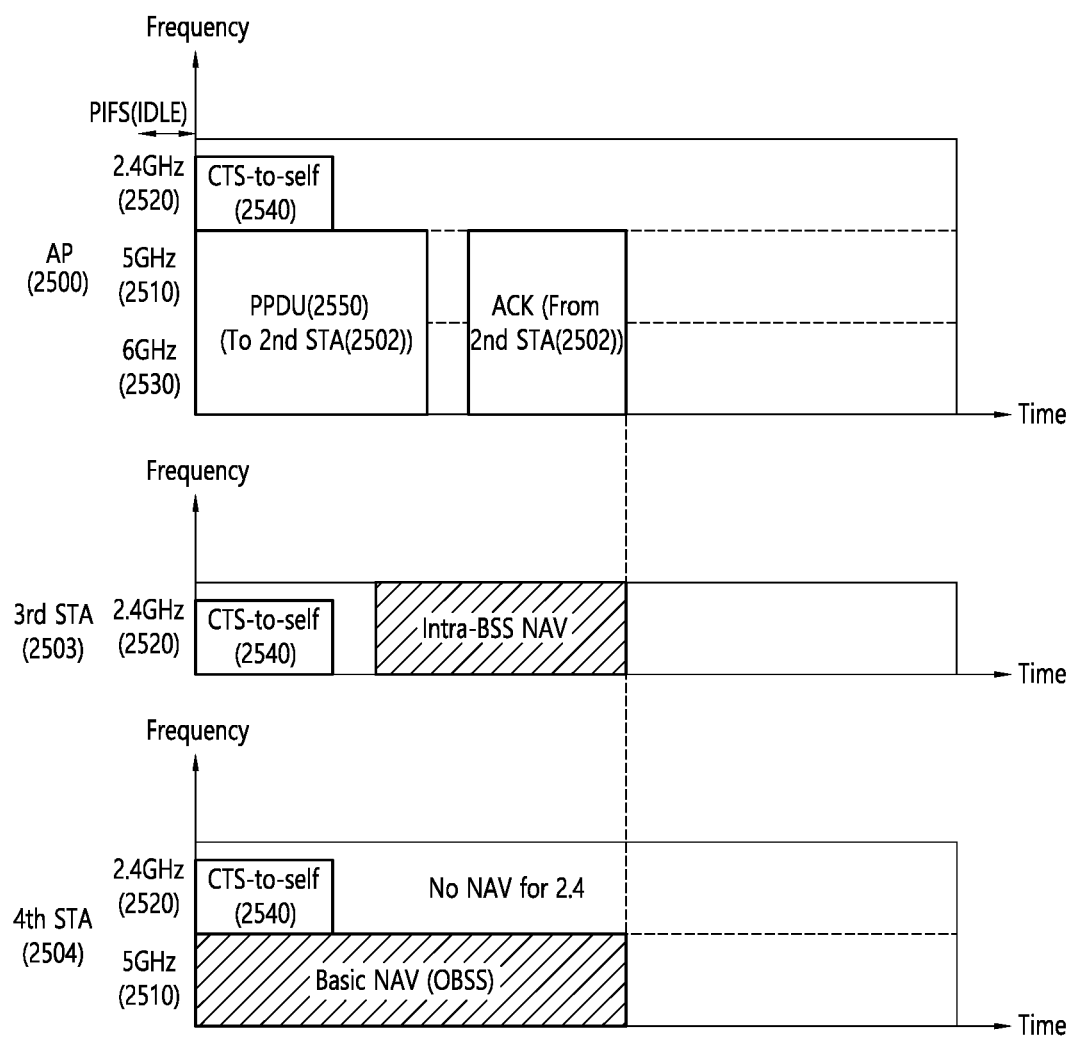
FIG. 25 illustrates an example in which an STA sets a NAV according to CASE 2-2.

FIG. 25 illustrates an example in which an STA sets a NAV according to CASE 2-2.

FIG. 25 illustrates a specific example of CASE 2-2. Referring to FIG. 25, an AP 2500 can specify links to be aggregated from among the first link 2510 to the third link 2530 in order to transmit a PPDU 2550 to a second STA 2502. The AP 2500 can specify the first link 2510 and the third link 2530 as links to be aggregated on the basis of backoff count (BC) values and/or clear channel assessment (CCA) sensing results (busy/idle) of the first link 2510 to the third link 2530.

The AP 2500 can determine whether a second link is idle for a designated period. The designated period may include, for example, PIFS, AIFS, or one slot. When the second link is idle for the designated period, the AP 2500 can transmit a CTS-to-self frame 2540 through the second link 2520. Simultaneously, the AP 2500 can transmit the PPDU 2550 through the aggregated first and third links 2510 and 2530.

A third STA 2503 supporting the second link 2520 can receive the CTS-to-self frame 2540 through the second link 2520. The third STA 2503 can check that the PPDU 2550 is transmitted through the first link 2510 and the third link 2530 through the CTS-to-self frame 2540. The third STA 2503 can acquire a NAV value on the basis of the duration/ID field of the CTS-to-self frame 2540. The third STA 2503 can set a first type NAV for the second link 2520 on the basis of the NAV value. The first type NAV may include an intra-BSS NAV.

Technical features with respect to an operation of a fourth STA 2504 will be separately described below.

Figure 26:
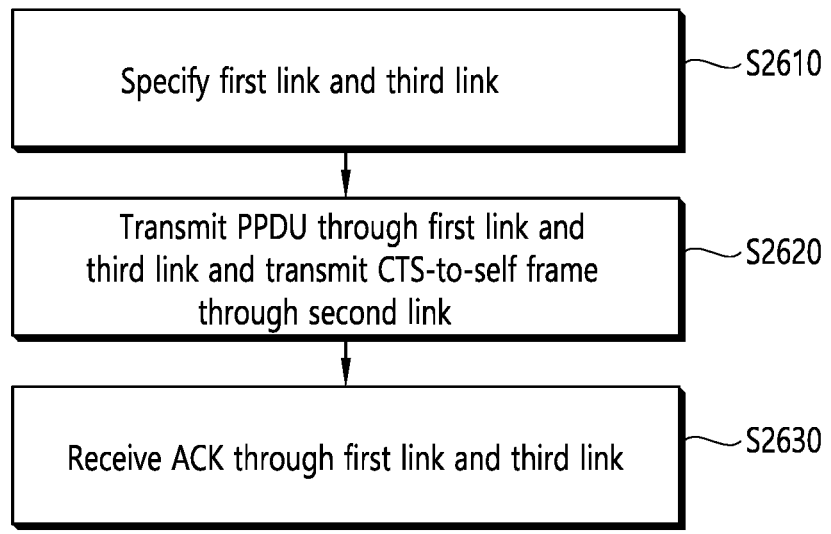
FIG. 26 is a flowchart for describing an example of an operation of a transmitting STA according to CASE 2-2.

FIG. 26 is a flowchart for describing an example of an operation of a transmitting STA according to CASE 2-2.

Referring to FIG. 26, a transmitting STA (e.g., AP 2500 in FIG. 25) can specify the first link and the third link in step S2610. Specifically, the transmitting STA can specify links to be aggregated from among the first to third links in order to transmit a PPDU to a second STA (e.g., the second STA 2502 in FIG. 25). The transmitting STA may specify the first link and the third link on the basis of BC values of the first link and the third link and/or CCA sensing results (busy/idle) of the first link and the third link through a backoff procedure. The transmitting STA can aggregate the first link and the third link.

In step S2620, the transmitting STA can transmit a PPDU through the first link and the third link and transmit a CTS-to-self frame through the second link. The transmitting STA can determine whether the second link is idle for a designated period before transmission of the CTS-to-self frame. The designated period may include, for example, PIFS, AIFS, or one slot. When the second link is idle for the designated period, the transmitting STA can transmit the CTS-to-self frame through the second link. In addition, the transmitting STA can transmit the PPDU through the aggregated first and third links. The transmitting STA can transmit the PPDU in the same length in the first link and the third link. The CTS-to-self frame may include information about links (the first link and the third link) through which the PPDU is transmitted and/or information about a NAV.

In step S2630, the transmitting STA can receive ACK through the first link and the third link. The transmitting STA can receive ACK through the aggregated first and third links. The transmitting STA can receive ACK from the second STA in response to the PPDU.

Figure 27:
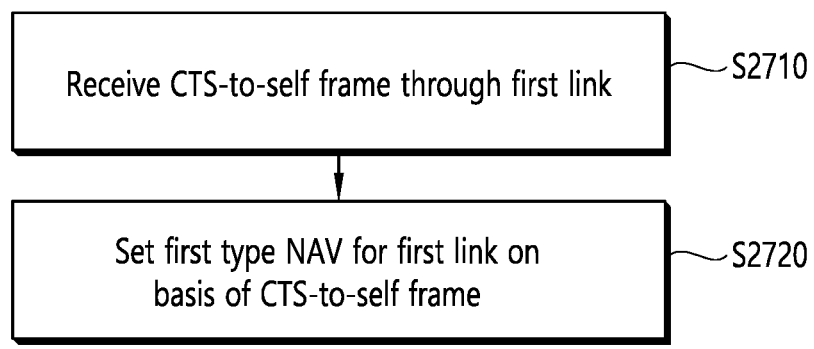
FIG. 27 is a flowchart for describing an example of an operation of a third STA according to CASE 2-2.

FIG. 27 is a flowchart for describing an example of an operation of a third STA according to CASE 2-2.

FIG. 27 illustrates an operation of the third STA in CASE 2-2. Referring to FIG. 27, the third STA (e.g., the third STA 2503 in FIG. 25) can receive a CTS-to-self frame through the first link in step S2710. The CTS-to-self frame can be transmitted through the aggregated first and third links. The third STA supporting only the first link can receive the CTS-to-self frame through the first link.

In step S2720, the third STA can set a first type NAV for the first link on the basis of the CTS-to-self frame. The CTS-to-self frame may include information about a NAV. For example, the third STA can acquire a NAV value on the basis of the duration/ID field of the CTS-to-self frame. The third STA can set the first type NAV for the first link on the basis of the NAV value. The first type NAV may include an intra-BSS NAV. For example, the third STA can set an intra-BSS NAV related to the length of a TXOP period in which a transmitting STA communicates with a second STA through the aggregated first and third links. The third STA may not transmit a signal through the first link for the set intra-BSS NAV period.

CASE 2-3: a method of using multi-band (or multi-link) RTS/CTS before transmission of a first signal A transmitting STA can transmit a multi-band (MB) RTS frame and receive an MB CTS frame before transmission of a first signal. The transmitting STA can perform protection for a hidden node and an STA that cannot recognize/detect the first signal through the MB RTS frame and/or the MB CTS frame. In addition, the transmitting STA can acquire a TXOP through the MB RTS frame and/or the MB CTS frame. The MB RTS frame and/or the MB CTS frame may include information about a link through which the first signal is transmitted and information about a link through which the first signal is not transmitted. An STA (e.g., a third STA) supporting only the link through which the first signal is not transmitted can transmit an MB CTS frame in response to the MB RTS frame even when it receives the MB RTS frame. Accordingly, the STA supporting only the link through which the first signal is not transmitted can transmit, to a hidden STA, information about the link through which the first signal is transmitted and information about the link through which the first signal is not transmitted through the MB CTS frame. The hidden STA may include an STA that has not received the MB RTS frame. The hidden STA can set an intra-BSS NAV on the basis of the MB CTS frame. Then, the STA supporting only the link through which the first signal is not transmitted can set a first type NAV on the basis of the MB RTS frame. The first type NAV may include an intra-BSS NAV.

The transmitting STA can determine a link through which the first signal will be transmitted through a backoff procedure. That is, the link through which the first signal will be transmitted may be a link determined to be idle through CCA and thus may be a link in a ready state for transmission of the first signal. Accordingly, the transmitting STA can determine whether the link through which the first signal is not transmitted is idle for a designated period before transmission of the CTS-to-self frame. The designated period may include, for example, PIFS, AIFS, or one slot.

The MB RTS frame may also be called a multi-link (ML) RTS frame. The MB CTS frame may also be called a multi-link (ML) CTS frame.

For example, the transmitting STA can check that the second link is idle for the designated period (e.g., PIFS) before transmitting the first signal through the first link and the third link. The transmitting STA can transmit the MB RTS frame before transmitting the first signal through all links (or bands) supported thereby. The second STA that is a target STA of the first signal can transmit the MB CTS frame to the transmitting STA through the first link and the third link. The third STA can transmit the MB CTS frame through the second link even when the first signal is not a signal for the third STA. The third STA can set a first type NAV related to the length of a TXOP period in which the transmitting STA communicates with the second STA through the aggregated first and third links. The first type NAV may include an intra-BSS NAV. The third STA may not transmit a signal through the second link for the set first type NAV period.

Figure 28:
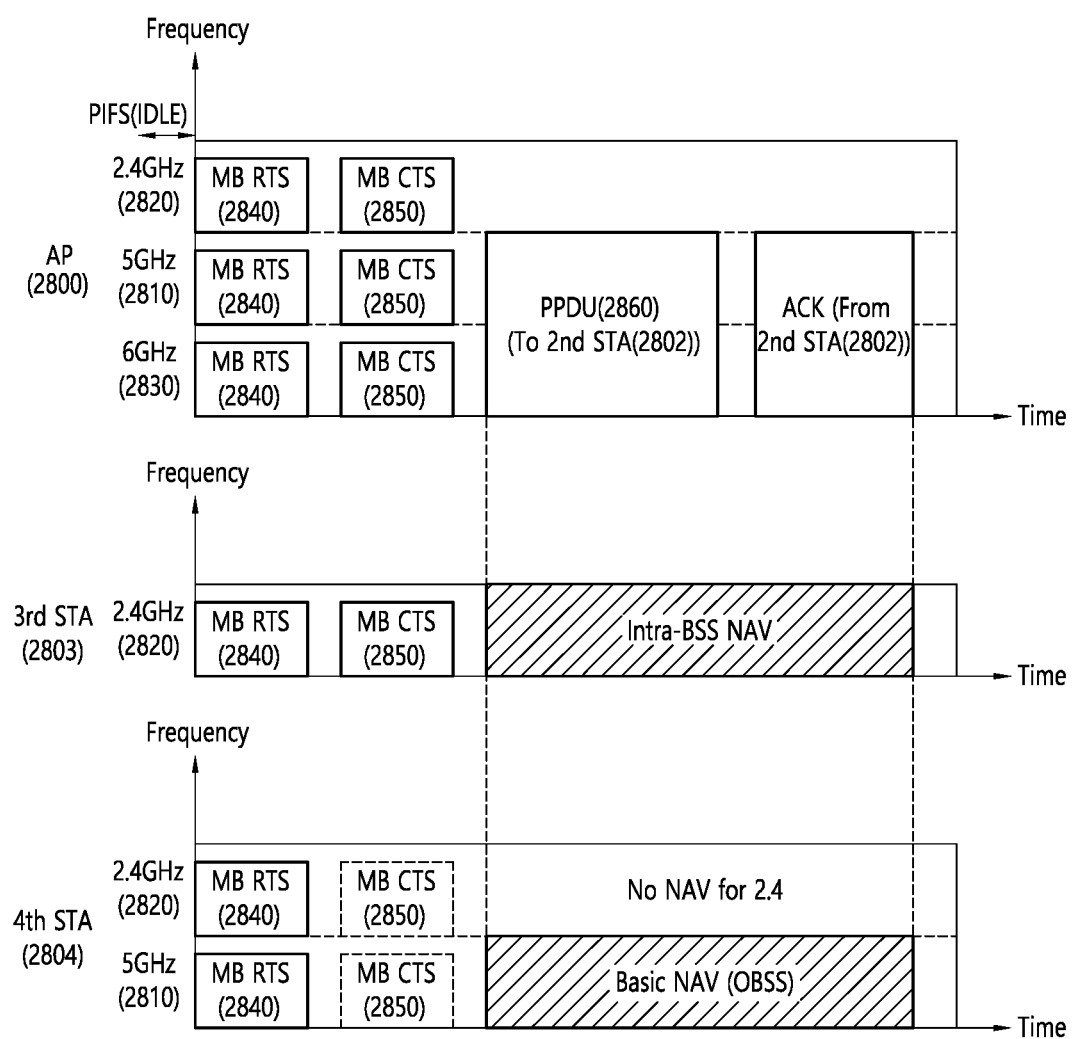
FIG. 28 illustrates an example in which an STA sets a NAV according to CASE 2-3.

FIG. 28 illustrates an example in which an STA sets a NAV according to CASE 2-3.

FIG. 28 illustrates a specific example of CASE 2-3. Referring to FIG. 28, an AP 2800 can specify links to be aggregated from among a first link 2810 to a third link 2830 in order to transmit a signal (or data) to a second STA 2802. The AP 2800 can specify the first link 2810 and the third link 2830 as links to be aggregated on the basis of backoff count (BC) values and/or clear channel assessment (CCA) sensing results (busy/idle) of the first link 2810 to the third link 2830.

The AP 2800 can determine whether a second link is idle for a designated period. The designated period may include, for example, PIFS, AIFS, or one slot. When the second link is idle for the designated period, the AP 2800 can transmit an MB RTS frame 2840 through all links (or bands) supportable thereby. That is, the AP 2800 can transmit the MB RTS frame 2840 through the first link 2810 to the third link 2830. Although the MB RTS frame 2840 is illustrated as a single frame, the MB RTS frame 2840 may include MB RTS frames independently transmitted in the first link to the third link. The MB RTS frame 2840 may include information about links (i.e., the first link 2810 and the third link 2830) through which a PPDU 2860 is transmitted and information about a NAV.

A third STA 2803 supporting the second link 2820 can receive the MB RTS frame 2840 through the second link 2820. The third STA 2803 can check that the PPDU 2860 which will be subsequently transmitted is a PPDU for the second STA 2802. The third STA 2803 can acquire a NAV value on the basis of a duration/ID field of the MB RTS frame 2840. The third STA 2803 can transmit an MB CTS 2850 through the second link 2820 in response to the MB RTS frame 2840 before setting a NAV for the second link 2820. The third STA 2803 can set a first type NAV for the second link 2820 on the basis of the NAV value.

Technical features with respect to an operation of a fourth STA 2804 will be separately described below.

Figure 29:
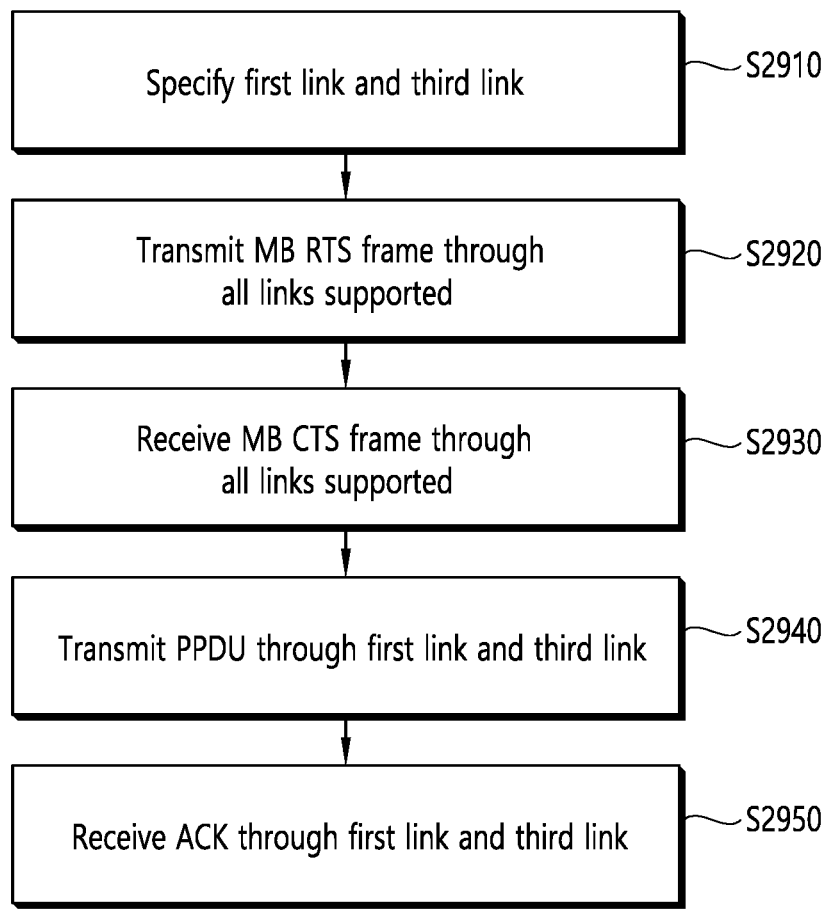
FIG. 29 is a flowchart for describing an example of an operation of a transmitting STA according to CASE 2-3.

FIG. 29 is a flowchart for describing an example of an operation of a transmitting STA according to CASE 2-3.

Referring to FIG. 29, a transmitting STA (e.g., AP 2800 in FIG. 28) can specify the first link and the third link in step S2910. Specifically, the transmitting STA can specify links to be aggregated from among the first to third links in order to transmit a PPDU to a second STA (e.g., the second STA 2802 in FIG. 28). The transmitting STA may specify the first link and the third link on the basis of BC values of the first link and the third link and/or CCA sensing results (busy/idle) of the first link and the third link through a backoff procedure. The transmitting STA can aggregate the specified first link and the third link.

In step S2920, the transmitting STA can transmit an MB RTS frame through all links supported thereby. That is, the transmitting STA can transmit the MB RTS frame through the first link to the third link. The transmitting STA can determine whether the second link is idle for a designated period before transmission of the MB RTS frame. The designated period may include, for example, PIFS, AIFS, or one slot. When the second link is idle for the designated period, the transmitting STA can transmit the MB RTS frame through the first link to the third link. The MB RTS frame may include information about a target STA (i.e., the second STA) that is a transmission target of a PPDU that will be subsequently transmitted. Further, the MB RTS frame may include information about links (the first link and the third link) through which the PPDU is transmitted and/or information about a NAV.

In step S2930, the transmitting STA can receive an MB CTS frame through all links supported thereby. That is, the transmitting STA can receive the MB CTS frame through the first link to the third link. The MB CTS frame may be a response frame to an MB RTS frame transmitted from an STA belonging to the same BSS to which the transmitting STA belongs. For example, the transmitting STA can receive the MB CTS frame from the STA to which the PPDU will be transmitted.

In step S2940, the transmitting STA can transmit the PPDU through the first link and the third link. The transmitting STA can transmit the PPDU to the second STA through the aggregated first and third links. The transmitting STA can transmit the PPDU in the same length in the first link and the third link.

In step S2950, the transmitting STA can receive ACK through the first link and the third link. The transmitting STA can receive ACK through the aggregated first and third links. The transmitting STA can receive ACK from the second STA in response to the PPDU.

Figure 30:
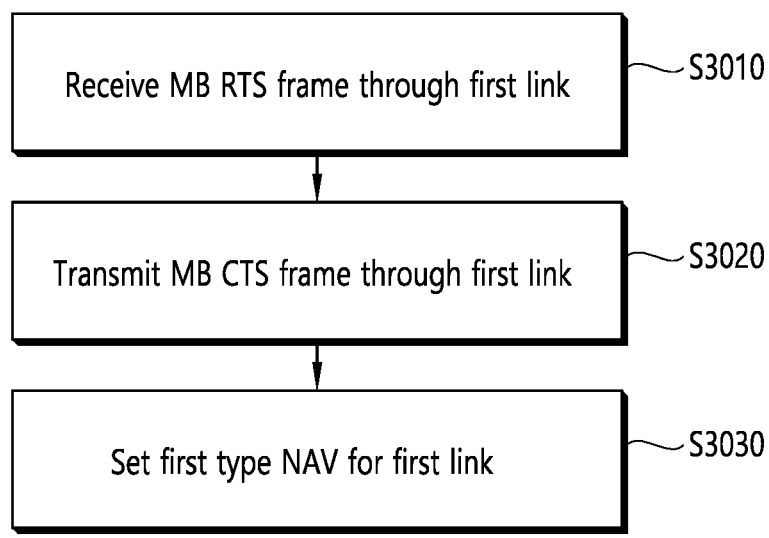
FIG. 30 is a flowchart for describing an example of an operation of a third STA according to CASE 2-3.

FIG. 30 is a flowchart for describing an example of an operation of a third STA according to CASE 2-3.

Referring to FIG. 30, the third STA can receive an MB RTS frame through the first link in step S3010. The MB RTS frame can be transmitted through the first link to the third link. The third STA supporting only the first link can receive the MB RTS frame through the first link. The third STA can check that a PPDU that will be subsequently transmitted is a signal for the second STA. The third STA can check that the PPDU will be subsequently transmitted through the first link and the third link.

In step S3020, the third STA can transmit an MB CTS frame. The third STA can transmit the MB CTS frame in response to the MB RTS frame. An STA that has not received the MB RTS can set a NAV (e.g., intra-BSS NAV) on the basis of the MB CTS frame transmitted form the third STA.

In step S3030, the third STA can set a first type NAV for the first link on the basis of the MB RTS frame. The MB RTS frame may include information about a NAV. For example, the third STA can acquire a NAV value on the basis of the duration/ID field of the NB RTS frame. The third STA can set the first type NAV for the first link on the basis of the NAV value. The first type NAV may include an intra-BSS NAV. For example, the third STA can set an intra-BSS NAV related to the length of a TXOP period in which a transmitting STA communicates with a second STA through the aggregated first and third links. The third STA may not transmit a signal through the first link for the set intra-BSS NAV period.

CASE 3: a method of setting a basic NAV in the case of an OBSS STA

CASE 3 proposes an operation of an OBSS STA when the OBSS can recognize/detect a first signal. That is, CASE 3 may relate to the operation of the fourth STA. The OBSS STA (e.g., the fourth STA) can set a second type NAV for a link through which the first signal is transmitted irrespective of recognition/detection of the first signal. The second type NAV may include a basic NAV. As in CASE 2 (2-1 to 2-3), when a CTS-to-self frame or an MB RTS frame is received from a BSS different from a BSS to which the OBSS STA belongs, the OBSS STA can set the second type NAV for a link (e.g., the first link and the third link) through which the first signal is transmitted. However, the OBSS STA may not set the second type NAV for a link (e.g., the second link) through which the first signal is not transmitted. The OBSS STA can transmit a signal to the BSS thereof with respect to the link through which the first signal is not transmitted by not setting the second type NAV for the link through which the first signal is not transmitted. The second type NAV may include a basic NAV.

The OBSS STA can acquire information about the link through which the first signal is transmitted and/or information about a NAV through the MB RTS frame or the CTS-to-self frame. The OBSS STA can set the second type NAV for the link through which the first signal is transmitted on the basis of the information about the link through which the first signal is transmitted and/or the information about a NAV. The OBSS STA may not set the second type NAV for the link through which the first signal is not transmitted on the basis of the information about the link through which the first signal is transmitted and/or the information about a NAV.

In addition, as in CASE 1, the OBSS STA may acquire a NAV value from the first signal instead of the CTS-to-self frame or the MB RTS frame. The OBSS STA may set the second type NAV for the link through which the first signal is transmitted on the basis of the NAV value. If the OBSS STA does not support the link through which the first signal is transmitted, collision between signals may not occur because the OBSS STA belongs to the BSS unrelated to the link through which the first signal is transmitted. Accordingly, the OBSS STA that does not support the link through which the first signal is transmitted may not set the second type NAV.

For example, according to CASE 1, the transmitting STA can transmit the first signal through the first link and the third link. The fourth STA that is an OBSS STA can receive the first signal through the first link. The fourth STA can check that the first signal is not transmitted from the BSS thereof. The fourth STA can acquire a NAV value on the basis of the first signal. The fourth STA can set a basic NAV for the first link on the basis of the NAV value. The fourth STA may not set a NAV for a second link that is another link supported by the fourth STA.

As another example, according to CASE 2 (2-1 to 2-3), the transmitting STA can transmit a CTS-to-self frame or an MB RTS frame. The fourth STA that is an OBSS STA can acquire information about a link through which the first signal is transmitted and/or information about a NAV on the basis of the MB RTS frame or the CTS-to-self frame. The fourth STA can set a basic NAV for the first link that is a link through which the first signal is transmitted. The fourth STA may not set a basic NAV for the second link that is a link through which the first signal is not transmitted.

The operation of an OBSS will be described below with reference to FIG. 22, FIG. 25, and FIG. 28.

Referring back to FIG. 22, the fourth STA 2204 supporting the first link 2210 and the second link 2220 can receive the CTS-to-self frame 2240 through the first link 2210 and the second link 2220. The fourth STA 2204 may belong to a BSS (i.e., OBSS) different from the BSS to which the AP 2200 belongs. The fourth STA 2204 can check information about links (the first link 2210 and the third link 2230) through which the PPDU 2250 is transmitted and/or information about a NAV on the basis of the CTS-to-self frame 2240. That is, the fourth STA 2204 can check that the PPDU 2250 will be transmitted through the first link 2210 and the third link 2230. The fourth STA 2204 can set a second type NAV for the first link 2210 on the basis of the information about a NAV. The second type NAV may include a basic NAV. The fourth STA 2204 may not set the second type NAV for the second link 2220.

Referring back to FIG. 25, the fourth STA 2504 supporting the first link 2510 and the second link 2520 can receive the CTS-to-self frame 2540 through the second link 2520. The fourth STA 2504 can receive the PPDU 2550 through the first link 2510. The fourth STA 2504 may belong to a BSS (i.e., OBSS) different from the BSS to which the AP 2500 belongs. The fourth STA 2504 can check information about links (the first link 2510 and the third link 2530) through which the PPDU 2550 is transmitted on the basis of the CTS-to-self frame 2540. In addition, the fourth STA 2504 can check information about links through which the PPDU 2550 is transmitted and/or information about a NAV on the basis of the PPDU 2550. The fourth STA 2504 can set a second type NAV for the first link 2510 on the basis of the CTS-to-self frame 2540 and/or the PPDU 2550. The second type NAV may include a basic NAV. The fourth STA 2504 may not set the second type NAV for the second link 2520.

Referring back to FIG. 28, the fourth STA 2804 supporting the first link 2810 and the second link 2820 can receive the MB RTS frame 2840 through the first link 2810 and the second link 2820. The fourth STA 2804 may belong to a BSS (i.e., OBS S) different from the BSS to which the AP 2800 belongs. The fourth STA 2804 can check information about links (the first link 2810 and the third link 2830) through which the PPDU 2860 is transmitted and/or information about a NAV on the basis of the MB RTS frame 2840. That is, the fourth STA 2804 can check that the PPDU 2860 is transmitted through the first link 2810 and the third link 2830. The fourth STA 2804 can set a second type NAV for the first link 2810. The second type NAV may include a basic NAV. The fourth STA 2804 may not set the second type NAV for the second link 2820.

Figure 31:
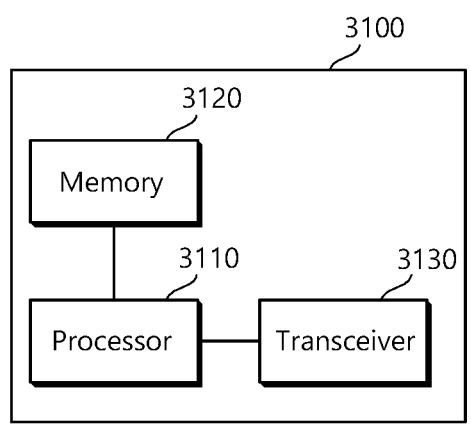
FIG. 31 illustrates a transmitting STA or a receiving STA to which an example of the present disclosure is applied.

FIG. 31 illustrates a transmitting STA or a receiving STA to which an example of the present disclosure is applied.

Referring to FIG. 31, the STA 3100 may include a processor 3110, a memory 3120, and a transceiver 3130. The features of FIG. 31 may be applied to a non-AP STA or an AP STA. The illustrated processor, memory, and transceiver may be implemented as separate chips, or at least two or more blocks/functions may be implemented through a single chip.

The illustrated transceiver 3130 performs a signal transmission/reception operation. Specifically, the transceiver 3130 may transmit and receive IEEE 802.11 packets (e.g., IEEE 802.11a/b/g/n/ac/ax/be, etc.).

The processor 3110 may implement the functions, processes, and/or methods proposed in the present disclosure. Specifically, the processor 3110 may receive a signal through the transceiver 3130, process the received signal, generate a transmission signal, and perform control for signal transmission.

The processor 3110 may include an application-specific integrated circuit (ASIC), another chipset, a logic circuit, and a data processing device. The memory 3120 may include read-only memory (ROM), random access memory (RAM), flash memory, memory card, storage medium, and/or other storage device.

The memory 3120 may store a signal (i.e., a reception signal) received through the transceiver and may store a signal (i.e., a transmission signal) to be transmitted through the transceiver. That is, the processor 3110 may acquire the received signal through the memory 3120 and store the signal to be transmitted in the memory 3120.

Figure 32:
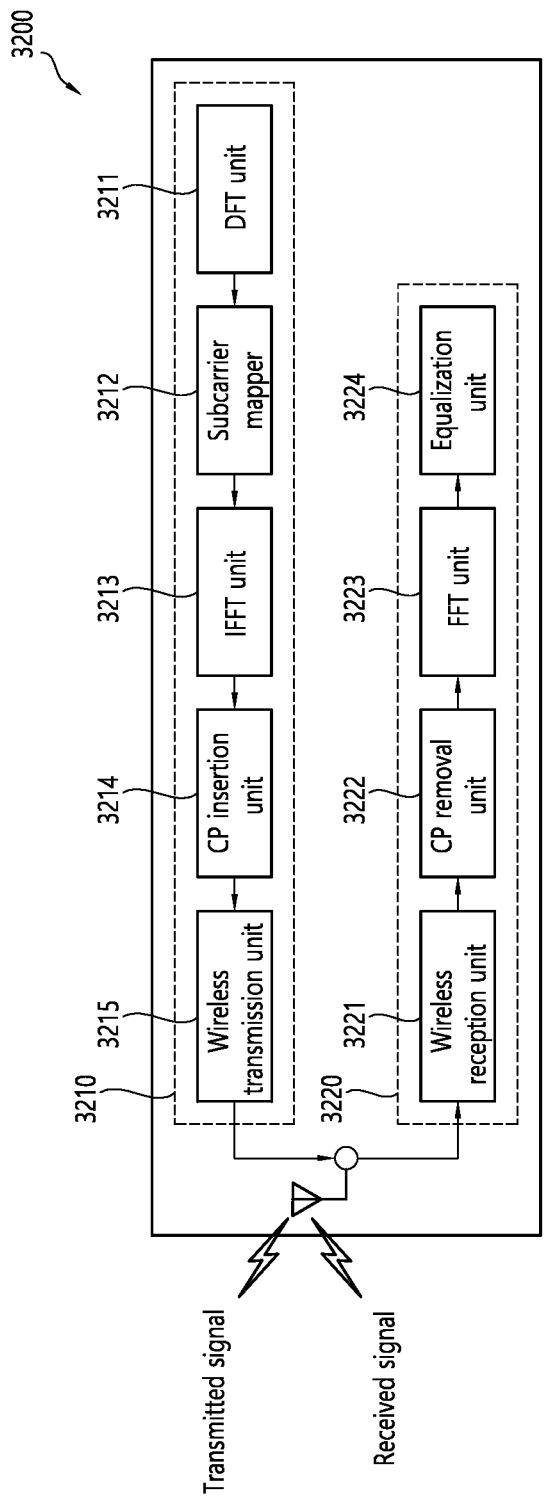
FIG. 32 illustrates another example of a detailed block diagram of a transceiver.

FIG. 32 illustrates another example of a detailed block diagram of a transceiver. Some or all blocks of FIG. 32 may be included in the processor 3110. Referring to FIG. 32, a transceiver 3200 includes a transmission part 3201 and a reception part 3202. The transmission part 3201 includes a discrete Fourier transform (DFT) unit 3211, a subcarrier mapper 3212, an IDFT/(inverse fast Fourier transform) IFFT unit 3213, a CP insertion unit 3214, and a wireless transmission unit 3215. The transmission part 3201 may further include a modulator. In addition, for example, the transmission part 3201 may further include a scramble unit (not shown), a modulation mapper (not shown), a layer mapper (not shown), and a layer permutator (not shown), and these components may be arranged before the DTF unit 3211. That is, in order to prevent an increase in a peak-to-average power ratio (PAPR), the transmission part 3201 allows information to first go through first the DFT unit 3211 before mapping a signal to a subcarrier. After a signal spread by the DFT unit 3211 (or precoded in the same sense) is mapped through the subcarrier mapper 3212, the mapped signal goes through the IDTF/IFFT unit 3213 so as to be generated as a signal on a time axis.

The DFT unit 3211 performs DFT on input symbols and outputs complex-valued symbols. For example, when Ntx symbols are input (here, Ntx is a natural number), a DFT size is Ntx. The DFT unit 3211 may be referred to as a transform precoder. The subcarrier mapper 3212 maps the complex-valued symbols to each subcarrier in a frequency domain. The complex symbols may be mapped to resource elements corresponding to a resource block allocated for data transmission. The subcarrier mapper 3212 may be referred to as a resource element mapper. The IDFT/IFFT unit 3213 performs IDFT/IFFT on an input symbol and outputs a baseband signal for data as a time domain signal. The CP insertion unit 3214 copies a rear part of the base band signal for data and inserts it into a front part of the base band signal for data. Inter-symbol interference (ISI) and inter-carrier interference (ICI) may be prevented through CP insertion, so that orthogonality may be maintained even in a multipath channel.

Meanwhile, the receiving part 3202 includes a wireless reception unit 3221, a CP removal unit 3222, an FFT unit 3223, an equalization unit 3224, and the like. The wireless reception unit 3221, the CP removing unit 3222, and the FFT unit 3223 of the receiving part 3202 perform reverse functions of the wireless transmission unit 3215, the CP inserting unit 3214, and the IFF unit 3213 of the transmitting part 3201. The receiving part 3202 may further include a demodulator.

In addition to the illustrated blocks, the transceiver of FIG. 32 may include a reception window controller (not shown) extracting a part of a received signal and a decoding operation processing unit (not shown) performing a decoding operation on a signal extracted through a reception window.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

What is claimed is:

1. A method performed in a wireless local area network (WLAN) system, comprising:
    transmitting, by a station (STA), an Association Request frame to an access point (AP), wherein the Association Request frame includes first capability information of the STA, wherein the first capability information includes a first field related to whether the STA supports a multi-link operation, a second field related to a first link identifier (ID) of the multi-link operation supported by the STA, and a third field related to whether the STA supports a communication in a 6 GHz band, wherein the STA supports a first link and a second link for the multi-link operation;
    in response to the Association Request frame, receiving, by the STA, an Association Response frame from the AP, wherein the Association Response frame includes second capability information of the AP, wherein the second capability information includes a forth field related to whether the AP supports the multi-link operation, a fifth field related to a second link identifier (ID) of the multi-link operation supported by the AP, and a sixth field related to whether the AP supports a communication in the 6 GHz band;
    receiving, by the STA from the AP, a physical protocol data unit (PPDU) through the first link,
    wherein the PPDU includes a physical (PHY) preamble including a first control signal field and a second control signal field being contiguous to the first control signal field,
    wherein the first control signal field includes first bits related to a transmission opportunity (TXOP) of the PPDU, second bits related to a basic service set (BSS) color ID field of the PPDU, and
    wherein the second control signal field includes third bits related to an intended receiver address of the PPDU;
    setting, by the STA, a first intra-BSS network allocation vector (NAV) for the first link based on the second bits indicating a BSS color ID of the first STA and the third bits not indicating the STA; and
    setting, by the STA, a second intra-BSS NAV for the second link based on the second bits indicating a BSS color ID of the first STA and the third bits not indicating the STA,
    wherein a duration of the first intra-BSS NAV and a duration of the second intra-BSS NAV are set based on the first bits, and the duration of the first intra-BSS NAV is set to be same as the duration of the second intra-BSS NAV.

2. The method of claim 1, wherein the PHY preamble further includes a short training field (STF) signal and a long training field (LTF) signal.

3. The method of claim 1, wherein the PHY preamble further includes a legacy signal (L-SIG) field and a repeated L-SIG field which is a repeat of the L-SIG field.

4. The method of claim 1, wherein the PPDU is an Extremely High Throughput (EHT) PPDU.

5. A first station (STA) supporting first and second links, the first STA comprising:
    a transceiver for transmitting/receiving RF signals; and
    a processor connected to the transceiver,
    wherein the processor is configured to:
    transmit an Association Request frame to an access point (AP), wherein the Association Request frame includes first capability information of the STA, wherein the first capability information includes a first field related to whether the STA supports a multi-link operation, a second field related to a first link identifier (ID) of the multi-link operation supported by the STA, and a third field related to whether the STA supports a communication in a 6 GHz band, wherein the STA supports a first link and a second link for the multi-link operation;
    in response to the Association Request frame, receive an Association Response frame from the AP, wherein the Association Response frame includes second capability information of the AP, wherein the second capability information includes a forth field related to whether the AP supports the multi-link operation, a fifth field related to a second link identifier (ID) of the multi-link operation supported by the AP, and a sixth field related to whether the AP supports a communication in the 6 GHz band;

receive a physical protocol data unit (PPDU) through the first link from the AP, wherein the PPDU includes a physical (PHY) preamble including a first control signal field and a second control signal field being contiguous to the first control signal field, wherein the first control signal field includes first bits related to a transmission opportunity (TXOP) of the PPDU, second bits related to a basic service set (BSS) color ID field of the PPDU, and wherein the second control signal field includes third bits related to an intended receiver address of the PPDU;

set a first intra-BSS network allocation vector (NAV) for the first link based on the second bits indicating a BSS color ID of the first STA and the third bits not indicating the STA; and set a second intra-BSS NAV for the second link based on the second bits indicating a BSS color ID of the first STA and the third bits not indicating the STA, wherein a duration of the first intra-BSS NAV and a duration of the second intra-BSS NAV are set based on the first bits, and the duration of the first intra-BSS NAV is set to be same as the duration of the second intra-BSS NAV.

6. The STA of claim 5, wherein the PHY preamble further includes a short training field (STF) signal and a long training field (LTF) signal.

7. The STA of claim 5, wherein the PHY preamble further includes a legacy signal (L-SIG) field and a repeated L-SIG field which is a repeat of the L-SIG field.

8. The STA of claim 5, wherein the PPDU is an Extremely High Throughput (EHT) PPDU.

* * * * *